United States Patent [19]
Borghesi et al.

[11] Patent Number: 5,950,169
[45] Date of Patent: Sep. 7, 1999

[54] SYSTEM AND METHOD FOR MANAGING INSURANCE CLAIM PROCESSING

[75] Inventors: Nancy Borghesi, Wilmette, Ill.; Jeff Chen, Hacienda Heights, Calif.; Charles Frankel, Chicago, Ill.; Margaret Ho, San Diego; Alan Mandler, Los Angeles, both of Calif.; Githesh Ramamurthy, Winnetka, Ill.; Kelly Stephen, Riverside, Calif.; Kathy Wilharm, Rolling Meadows, Ill.

[73] Assignee: CCC Information Services, Inc., Chicago, Ill.

[21] Appl. No.: 08/555,732

[22] Filed: Nov. 9, 1995

Related U.S. Application Data

[63] Continuation-in-part of application No. 08/437,773, May 9, 1995, abandoned, which is a continuation-in-part of application No. 08/063,790, May 19, 1993, Pat. No. 5,504,674.

[51] Int. Cl.$^6$ .................................................. G06F 17/60
[52] U.S. Cl. .......................... 705/4; 345/329; 345/334; 345/340; 345/352; 705/400; 707/104
[58] Field of Search ............................. 395/204; 345/329, 345/334, 335, 339, 340, 352; 364/400; 705/1, 2, 3, 4, 400; 707/104, 200

[56] References Cited

U.S. PATENT DOCUMENTS

| | | | |
|---|---|---|---|
| 3,829,844 | 8/1974 | Zonneveld et al. . | |
| 3,974,472 | 8/1976 | Balashov et al. . | |
| 4,060,915 | 12/1977 | Conway . | |
| 4,404,639 | 9/1983 | McGuire et al. . | |
| 4,413,314 | 11/1983 | Slater et al. . | |
| 4,420,234 | 12/1983 | Dolejsi et al. . | |
| 4,435,769 | 3/1984 | Nagano et al. . | |
| 4,468,755 | 8/1984 | Iida . | |
| 4,491,725 | 1/1985 | Pritchard | 705/2 |
| 4,520,399 | 5/1985 | Iida . | |
| 4,538,183 | 8/1985 | Kanno et al. . | |
| 4,558,374 | 12/1985 | Kurata et al. . | |
| 4,616,854 | 10/1986 | Landrum et al. . | |
| 4,646,250 | 2/1987 | Childress | 395/250 |
| 4,667,248 | 5/1987 | Kanno . | |
| 4,691,238 | 9/1987 | Yamada . | |
| 4,725,892 | 2/1988 | Suzuki et al. . | |
| 4,752,908 | 6/1988 | Bouillot . | |
| 4,774,569 | 9/1988 | Morton et al. . | |
| 4,837,635 | 6/1989 | Santos . | |
| 4,891,702 | 1/1990 | Nakayama et al. . | |
| 4,893,258 | 1/1990 | Sakuragi . | |
| 4,899,292 | 2/1990 | Montagna et al. . | |
| 4,972,318 | 11/1990 | Brown et al. . | |
| 4,992,940 | 2/1991 | Dworkin . | |
| 5,128,859 | 7/1992 | Carbone et al. . | |
| 5,146,404 | 9/1992 | Calloway et al. . | |
| 5,168,444 | 12/1992 | Cukor et al. . | |
| 5,185,857 | 2/1993 | Rozmanith et al. . | |
| 5,218,539 | 6/1993 | Elphick et al. . | |
| 5,283,865 | 2/1994 | Johnson . | |
| 5,287,447 | 2/1994 | Miller et al. . | |
| 5,293,309 | 3/1994 | Sakai et al. . | |
| 5,317,503 | 5/1994 | Inoue . | |
| 5,377,098 | 12/1994 | Sakai . | |
| 5,390,330 | 2/1995 | Talati . | |
| 5,428,729 | 6/1995 | Chang et al. | 395/153 |
| 5,432,904 | 7/1995 | Wong . | |
| 5,444,841 | 8/1995 | Glaser et al. . | |
| 5,504,674 | 4/1996 | Chen et al. | 705/4 |
| 5,506,834 | 4/1996 | Sekihata et al. | 370/17 |
| 5,839,112 | 11/1998 | Schreitmueller et al. | 705/21 |

*Primary Examiner*—Edward R. Cosimano
*Attorney, Agent, or Firm*—Brinks Hofer Gilson & Lione

[57] ABSTRACT

A system and method for managing and processing insurance claims is provided that implements an object oriented graphic user interface. The system includes at least one remote computer for entering and viewing insurance claim information. A wide area network capable of communicating with the remote computer and a computer in communication with said wide area network are also included. An insurance datafile, generated at said remote computer, is transferrable over the network. The method includes the steps of transmitting a claim assignment from an insurance office computer to a mailbox in a communications server, retrieving the assignment at a remote computer and generating an insurance claim datafile containing all data pertinent to an insurance claim and allowing for bidirectional transmission of the datafile over a wide area network. A graphic user interface for use in managing an insurance claim from an initial claim to final settlement is also included. The interface has common workflow objects such as an in box, an in process box, and an out box, for managing and manipulating one or more workfiles.

39 Claims, 29 Drawing Sheets

Microfiche Appendix Included
(49 Microfiche, 4715 Pages)

FIG. 7

FILE EDIT VIEW HELP

PATHWAYS - IN PROCESS - ANDERSON, MICHAEL

NOTE..

WORKFLOW

1 IN BOX 0 ITEMS

2 IN PROCESS 5 ITEMS

3 OUT BOX 3 ITEMS

4 STORAGE

5 REPORTS

○ SETTLEMENT  ⊙ EVENT LOG  ✋ TOTALS  ○ ADJUSTMENTS  📝 NOTES  $$ RATES  ⇄ TOTAL LOSS  Ⓐ SALVAGE

DATE: CURRENT  TYPE: BORDERLINE

| | | | |
|---|---|---|---|
| ESTIMATE TOTAL: $ | 1591.00 | BASE VALUE: $ | 2000.00 |
| PRE-TAX ADJ TOTAL: $ | 35.00 | PRE-TAX ADJ TOTAL: $ | 35.00 |
| SUBTOTAL: $ | 1626.00 | SUBTOTAL: $ | 2035.00 |
| TAX: $ | 116.74 | TAX: $ | 0.00 |
| POST-TAX ADJ TOTAL: $ | 26.00 | POST TAX ADJ TOTAL: $ | -15.00 |
| SUBTOTAL: $ | 1767.74 | SUBTOTAL: $ | 2020.00 |
| BETTERMENT $ | 76.50 | NET SALVAGE VALUE $ | 0.00 |
| DEDUCTIBLE $ | 250.00 | DEDUCTIBLE: $ | 250.00 |
| COST TO REPAIR $ | 1441.24 | COST TO TOTAL $ | 1770.00 |

| EST LINE OPER | DESCRIPTION | QTY | PRICE | LABOR | PAINT |
|---|---|---|---|---|---|
| 2 REPL | RT FENCLER | 1 | 215.00 | 2.8 | 2.5 |
| 3 ADD | FOR CLEAR COST | 0 | 0.00 | 0.0 | 1.0 |
| 4 ADD | FOR EDGING | 0 | 0.00 | 0.0 | 0.5 |
| 5 REPL | RT MOLDING WHEEL OPENING | 1 | 42.50 | 0.2 | 0.0 |
| 6 DRILL | TIME (NEW PANEL) | 0 | 0.00 | 0.2 | 0.0 |
| 7 REPL | RT EMBLEM GRAND NATION | 1 | 35.25 | 0.2 | 0.0 |

TOTAL COST OF ESTIMATE 450.87

1986 BUIC LESABRE CUSTOM FRONT DOOR 4 DOOR MODELS DOOR ASSEMBLY

| 1 DOOR SHELL | R 86 | D | 971.00 | 4.5 | 2.8 |
| 1 DOOR SHELL | L 86 | D | 971.00 | 4.5 | 2.8 |
| 1 DOOR SHELL STOPPER | 86-91 | | 8.79 | | |
| 2 OUTER PANEL | R 86-91 | | 194.00 | 5.0 | 2.5 |
| 2 OUTER PANEL | L 86-91 | | 194.00 | 5.0 | 2.5 |
| REINFORCE BAR | R 86-88 | | 106.00 | 8.6 | |

ON SOME REPLACEMENT DOOR SHELLS IT MAY BE NECESSARY TO DRILL HINGE MOUNTING HOLES AND TRANSFER HINGE MOUNTING PLATES. ADJUST TIME ACCORDINGLY. ON MODELS WITH PASSIVE RESTRAINT SYSTEMS ADJUST TIME FOR TRANSFER OF SYSTEM COMPONENTS.

FIG. 10

SELECT RECYCLED PART

RECYCLED ASSEMBLY

| | COST |
|---|---|
| RT FT DOOR; 4DR | 335.00 ↑ |
| RT FT DOOR; SED, ELE WND | 220.00 |
| RT FT DOOR; SED, MAN WND | 305.00 ↓ |

RECYCLED ASSEMBLY TIME

| | YEAR | LABOR | PAINT |
|---|---|---|---|
| R&R DOOR ASSY, 2 DOOR | R 86-91 | 1.9 | 2.6 |
| R&R DOOR ASSY, 4 DOOR | R 86-91 | 1.9 | 2.5 |
| TIME INCLUDES R&I TRIM PANEL AND LOCK CYLINDER. ADD IF NECESSARY TO RECODE CYLINDER & KEY. | | | |

ADD TIME

| | | LABOR | PAINT |
|---|---|---|---|
| CLEAN, LUBE & ADJUST; LINKAGES & REGULATOR | - | 0.2 | 0.0 |
| TRANSFER DOOR GLASS | - | 1.8 | 0.0 |
| ADD FOR POWER UNITS | - | 0.3 | 0.0 |
| REFN JAMBS & HINGE | P | 0.0 | 1.0 |
| REFN HANDLE OUTSIDE | P | 0.0 | 0.3 |

PRICE: $ 220.00
LABOR: 1.9
PAINT: 2.5

[ ADD TO ESTIMATE ] [ ADD W/CHANGES... ] [ SKIP ] [ CANCEL ] [ HELP ]

PATHWAYS - IN PROCESS - OMDAHL B, JOHN

FILE  EDIT  VIEW  HELP

[NOTES] [OPEN DB] [LOCK ESTIMATE] [GO TO...] [COMPARE ASSEMBLY]

[ADMIN] [VEHICLE] [ESTIMATE] [EVENT LOG] [TOTALS] [NOTES] [RATES] [TOTAL COST] [SALVAGE]

○ LINES  ○ OTHER CHARGES  ○ TOTALS    SHOW: PRELIM. ESTIMATE

| H | O | EST LINE | OPER DESCRIPTION | QTY | PRICE | LABOR | PAINT |
|---|---|---|---|---|---|---|---|
| | | 9 | REPL LKQ RT FT DOOR, SED,ELE | 1 | 220.00 | 1.9 | 2.5 |
| | | 10 | OVERLAP MAJOR ADJ PANEL | 0 | 0.00 | 0.0 | 0.4 |
| | | 11 | ADD FOR CLEAR COAT | 0 | 0.00 | 0.0 | 0.4 |
| | | 12 | CLEAN, LUBE & ADJUST LINKAGE | 0 | 0.00 | 0.2 | 0.0 |
| | | 13 | ADD FOR POWER UNITS | 0 | 0.00 | 0.3 | 0.0 |
| | | 14 | REIN JAMBS & HINGE | 0 | 0.00 | 0.0 | 1.0 |

TOTAL COST OF ESTIMATE: 779.59

[O 1] [O 2] [O 3] [REPLACE] [REPAIR] [OTHER] [COMPARE] [GRAPHICS] [GUIDE]

1986 BUIC LESABRE CUSTOM FRONT DOOR 4 DOOR MODELS DOOR ASSEMBLY

| | | | | | |
|---|---|---|---|---|---|
| 1 DOOR SHELL | R 86 | D | 971.00 | 4.5 | 2.8 |
| 1 DOOR SHELL | L 86 | D | 971.00 | 4.5 | 2.8 |
| 1 DOOR SHELL STOPPER | | 86-91 | 0.79 | | |
| 2 OUTER PANEL | R 86-91 | | 194.00 | 5.0 | 2.5 |
| 2 OUTER PANEL | L 86-91 | | 194.00 | 5.0 | 2.5 |
| REINFORCE BAR | R 86-88 | | 106.00 | 0.6 | |

ON SOME REPLACEMENT DOOR SHELLS IT MAY BE NECESSARY TO DRILL HINGE MOUNTING HOLES AND TRANSFER HINGE MOUNTING PLATES. ADJUST TIME ACCORDINGLY. ON MODELS WITH PASSIVE RESTRAINT SYSTEMS ADJUST TIME FOR TRANSFER OF SYSTEM COMPONENTS 09.35PM-10/19

ESTIMATE LINE PROPERTIES

| GENERAL | ADJUSTMENT | VENDOR | COMPARISON | NOTE |

OFM DESCRIPTION: RT DOOR SHELL
RECYCE DESCRIPTION: RT DOOR; SED, ELE WHD

| | REPLACE (OEM) | REPLACE (ALTERNATE) | | REPAIR |
|---|---|---|---|---|
| | | RECYCLED | A/M | |
| PART TYPE: | OFM | | | |
| PART PRICE: | 971.00 | 220.00 | 450.00 | |
| LABOR HOURS: | 4.5 | 1.9 | 4.5 | 14.0 |
| REFINISH HOURS: | 2.8 | 2.5 | 2.0 | 2.5 |
| TOTAL AMOUNT: | 1123.04 | 348.58 | 827.88 | 431.20 |
| % DIFF. FROM OEM: | | -222.19 | -70.06 | -180.45 |
| $ DIFF. FROM OEM: | | -774.40 | -495.16 | -891.84 |

OPERATION:  ○ REPL OEM   ◉ REPL. RECYCLED  ○ REPL A/M   ○ REPAIR

[ ADD TO ESTIMATE ]    [ CANCEL ]    [ HELP ]

FIG. 13

PATHWAYS- IN PROCESS - WILHARM, KATHY

FILE   EDIT   VIEW   HELP

CREATE NEW   DELETE

WORKFLOW | ADMIN. | VEHICLE | ESTIMATE | EVENT LOG | TOTALS | NOTES

1 IN BOX 0 ITEMS

2 IN PROCESS 4 ITEMS

3 OUT BOX 3 ITEMS

4 STORAGE

5 REPORTS

SHOW [ALL]   EVANTE SORTED BY [DATE/TIME-DESCENDING]

| EVENT OCCURRED ON | TYPE | AUTHOR |
|---|---|---|
| 10/12/95 22:25:51 | PRELIMINARY SUPP. CREATED. | AUTOMATED |
| 10/10/95 19:13:00 | FIRST CUSTOMER CONTACT | WILHARM, KATHY |
| 10/10/95 19:12:34 | WORKFILE COPY IN OUT BOX. | AUTOMATED |
| 10/10/95 19:1 : | PRELIMINARY SUPP. CREATED. | AUTOMATED |
| 10/10/95 19:10:14 | WORKFILE ESTIMATE CHANGED | AUTOMATED |
| 10/10/95 19:06:02 | FOR CREATED. | AUTOMATED |
| 10/10/95 19:06:02 | WORKFILE STATED CHANGED. | AUTOMATED |
| 10/10/95 19:04:06 | FIRST ESTIMATE LINE. | AUTOMATED |
| 10/10/95 11:10:26 | VEHICLE WORKFILE CREATED. | AUTOMATED |

DATE OCCURRED: [10/10/95]   TIME OCCURRED: [07:10 PM]

TYPE: [                    ]

EVENT TEXT

VEHICLE WORKFILE STATE CHANGED FROM INSPECTED TO ASSIGNED

| | PATHWAYS IN PROCESS-WILHARM,KATHY | |
|---|---|---|
| FILE EDIT VIEW HELP | | |

[CREATE NEW] [DELETE]

WORKFLOW | ADMIN | VEHICLE | ESTIMATE | EVENT LOG | TOTALS | NOTES | $$$

1 IN BOX 0 ITEMS

2 IN PROCESS 4 ITEMS

3 OUT BOX 3 ITEMS

4 STORAGE

5 REPORTS

SHOW [ALL ▼]            EVENTS SORTED BY [DATE/TIME DESCENDING ▼]   — 350

| EVENT OCCURED ON | TYPE | AUTHOR |
|---|---|---|
| 10/18/95 10:45:00 | | |
| 10/18/95 10:43:42 | ACCEPTED BLD | WILHARM,KATHY |
| 10/12/95 22:25:51 | PRELIMINARY SUPP. CREATED | AUTOMATED |
| 10/10/95 19:13:00 | FIRST CUSTOMER CONTACT | WILHARM,KATHY |
| 10/10/95 19:12:34 | WORLDFILE COPY IN OUT BOX | AUTOMATED |
| 10/10/95 19:10:14 | PRELIMINARY SUPP. CREATED | AUTOMATED |
| 10/10/95 19:10:14 | WORKFILE STATE CHANGED | AUTOMATED |
| 10/10/95 19:06:02 | EOR CREATED | AUTOMATED |
| 10/10/95 19:06:02 | WORKFILE STATE CHANGED | AUTOMATED |

DATE OCCURRED: [10/18/95]   TIME OCCURRED: [11:45 AM]

TYPE: [ ]

EVENT TE | C1 FIRST CUSTOMER CONTACT            — 352
         | C2 SECOND CUSTOMER CONTACT
         | C3 THIRD CUSTOMER CONTACT
         | MA VEHICLE OWNER MISSED INSPECTION APPOINTMENT
         | MR MET WITH REPAIR FACILITY
         | NS NOTIFIED SALVAGE YARD

EVENT DESCRIPTION

SYSTEM AND METHOD FOR MANAGING INSURANCE CLAIM PROCESSING

RELATED APPLICATIONS

This application is a continuation-in-part of application Ser. No. 08/437,773 filed May 9, 1995, entitled INSURANCE CLAIMS ESTIMATE COMPARISON SYSTEM AND METHOD, which is a continuation-in-part of application Ser. No. 08/063,790 filed May 19, 1993, now U.S. Pat. No. 5,504,674. The above-referenced application, in its entirety, is incorporated herein by reference.

MICROFICHE APPENDIX

A Microfiche Appendix of the presently preferred source code is attached and comprises 49 sheets having a total of 4715 frames. The Microfiche Appendix contains material which is subject to copyright protection. The copyright owner has no objection to the facsimile reproduction by anyone of the Microfiche Appendix, as it appears in the Patent and Trademark Office patent files or records, but otherwise reserves all copyright rights whatsoever.

BACKGROUND OF THE INVENTION

This invention relates to a system and method for managing insurance claims work flow. More particularly, this invention relates to a method and system of handling insurance claims from an initial claim through final settlement.

Insurance companies generally process a claim by performing a number of related tasks that include numerical cost estimates, information management, and communications between, for example, insurance company offices and employees in the field. The sum of tasks performed in claims processing define a workflow that must be accommodated in the insurance industry. Existing methods and systems for handling insurance claims are typically limited to undertaking only one or a few of the daily tasks that make up insurance claim workflow. For example, some methods are limited to calculation of a specific type of damage or injury and generating an estimate for repairing or replacing the damaged or injured item.

The calculation of a repair cost estimate is often done on a computer by entering reference data from external sources. The computer program may generate a numerical value as a result of looking at the data from the external sources and comparing it to the items that need to be replaced or repaired. In one estimating system, a vehicle claim estimate related to car panel and chassis damage is calculated and provided to a user. In another system, an auto bodyshop generates an estimate, including a digitized image of the vehicle, that may be transmitted via modem to an insurance company. Other tasks necessary to insurance claims processing, such as communication between an insurance company and repair facilities or managing of correspondence are typically handled separately.

The various available methods and systems for generating insurance costs and estimates are typically further limited to individual discrete calculations. After an appraiser prepares an estimate for repairing a vehicle, a separate calculation is often completed through a separate computer program to compute total loss valuation of a vehicle. Although these individual calculations may be obtained through separate programs, the results of each of the programs are difficult or awkward to compare because of the separate programs and datafiles involved.

Similarly, although separate methods and systems for performing some of the administrative tasks in insurance claim processing workflow are available, each of these separate computer programs requires certain types of data and each outputs a certain type of data. The data required for the separate programs may overlap and lead to redundant data entry tasks being performed. Data sharing between the different, discrete methods and systems that an insurance company uses may be difficult due to incompatible data formats. Therefore, an insurance claim adjuster must spend time keeping track of, and running, the separate programs. Appraisers, repair shops, and others involved in claim processing often need to switch between, and learn how to operate, separate software programs having separate data and interface requirements. Present methods of handling insurance claims not only tend to require the use of separate software and hardware tools for various calculations, but also require separate organization of administrative material and client mailings to the insured party. Insurance companies often juggle many separate computer files and pieces of paper generated for each claim.

Accordingly, there is a need for a comprehensive system and method of managing an insurance claim work flow wherein all the tasks of processing a claim may be performed and evaluated. Such a system would have a common user interface to access the various calculation tools and administrative steps. It would also be advantageous to have a centralized electronic datafile containing all data relevant to a claim that would eliminate the need for separate paper files or datafiles and eliminate the need for wasteful reentry of existing data.

SUMMARY OF THE INVENTION

The present invention provides for a comprehensive method and system for processing insurance claims for use by insurance companies as well as appraisers, repair shops, salvage yards and other support industries related to insurance claim processing and resolution. One aspect of the present invention includes a method having the steps of first providing a remote computer and a computer in the home office of an insurance company that are in communication over a wide area network. An insurance claim datafile containing all data pertinent to an insurance claim is generated at the remote computer. A user transfers the datafile between the home office computer and at least one remote computer while the claim is being processed. A user modifies and builds sections of the insurance claim datafile at the remote computer based on information accessed from an external source such as a memory device or another computer.

In a preferred embodiment, the datafile contains data on the insured, including policy information; data on a claim, such as the extent of damage or injury; and data on satisfying a claim including repair estimates and total loss valuation of, for example, an automobile. Further, the preferred method includes the additional step of generating an event log that tracks all actions taken on a claim datafile. The method also preferably includes monitoring calculations of repair costs to determine if the repairs are approaching or exceeding the total loss valuation of a vehicle.

According to a second aspect of the invention, a system for processing an insurance claim is provided. The system includes a remote computer, a wide area network for communicating with the remote computer, and an insurance company home office computer in communication with the network. An insurance claim datafile, capable of transfer over the network is provided. The workfile may contain correspondence, electronic mail (e-mail) messages, an event log pertaining to the claim and data related to the insured and the claim. In a preferred embodiment, the insurance datafile comprises claim settlement information and information on recycled/salvaged replacement parts.

A graphic user interface for use in managing an insurance claim is also provided. The graphic user interface includes an "in box" for holding and demarcating at least one datafile that a user is about to work on, an "out box" for holding and demarcating at least one datafile that a user has completed work on, and an "in process" box that may hold at least one insurance datafile a user is currently working on. In one preferred embodiment, the in box, out box and in process box are concurrently visible to a user. In another embodiment, a plurality of sections visible as overlapping tabbed folder images are included in the graphic user interface. Each of the sections has a visible identification tab and the plurality of sections comprise a datafile.

One advantage of the presently preferred embodiment is that a single user, who previously had to master and juggle numerous programs and pieces of paper, may accomplish all the necessary insurance processing tasks using a single program that holds all claim information in a file in a single database. Other advantages, stemming from the common graphic user interface and single insurance claim workfile, are the elimination of redundant data entry and the ability to view separate calculations at the same time. Further, the entire administrative management of claim processing is aided through the preferred event log section of the insurance claim datafile.

BRIEF DESCRIPTION OF THE DRAWINGS

FIG. 7 is a preferred screen for use with the system of FIGS. 3 or 4 illustrating a juxtaposed total loss and repair cost comparison.

FIGS. 9–12 are additional information screens illustrating the steps and information used to calculate a repair estimate including comparisons of OEM, aftermarket and recycled parts.

FIGS. 13–15 are illustrations of the event log operation in a preferred embodiment.

DETAILED DESCRIPTION OF THE PRESENTLY PREFERRED EMBODIMENTS

The system and method of the present invention is a modular system for managing insurance claim processing that incorporates seamless or integrated PC-based applications with a common workfile/workflow-driven user interface.

The present invention provides a new and improved method and apparatus for processing claims, typically in an insurance environment. The concept of work flow is introduced, which not only includes calculation of a repair estimate but also includes total loss valuation, settlement, and paperless file management. The present method accomplishes claim processing by controlling the electronic transfer of files between various remote computers, including those located at vendors, body shops, salvage yards, insurance company, and other terminals which may be used in an insurance processing environment. A particular insurance claim to be processed is defined herein as a workfile. Each workfile represents one particular claim. A workfile can have a number of entries which would depend on a particular application. The following description is focussed on automobile claim processing but may equally apply to other types of insurance claim processing.

The presently preferred system provides a user with the networking capability for transferring all or part of the workfile between computers. Thus, a repair shop sends a workfile to the network which may in turn provide several cost estimates for parts, including OEM, after-market, and salvage values. Similarly, an insurance adjuster can send a workfile to a repair shop to facilitate the repair process. Protocol and formats for handling transmission of the workfile may be adjusted by the user within an "in box" and an "out box" provided in a preferred graphic user interface.

The workfile contains all the necessary information for field processing of insurance claims. This information includes administrative information that details the loss involved, the type of inspection done, any information from the inspection, and the particular adjuster assigned the claim. Policy information including the party names, statements from those at the scene and a chosen or preferred repair site for the vehicle is maintained with the administration information. The datafile also retains vehicle information describing the vehicle, identification, year, make, model, style and engine as well as options of the vehicle. Repair estimates are also contained in the workfile for repair including prior damage information, reference to recycled parts original equipment manufacturer (OEM) parts and repaired parts. The workfile retains further information related to taxes, labor rates, discounts, and other expenses involved in repairing a vehicle.

Figure 1:
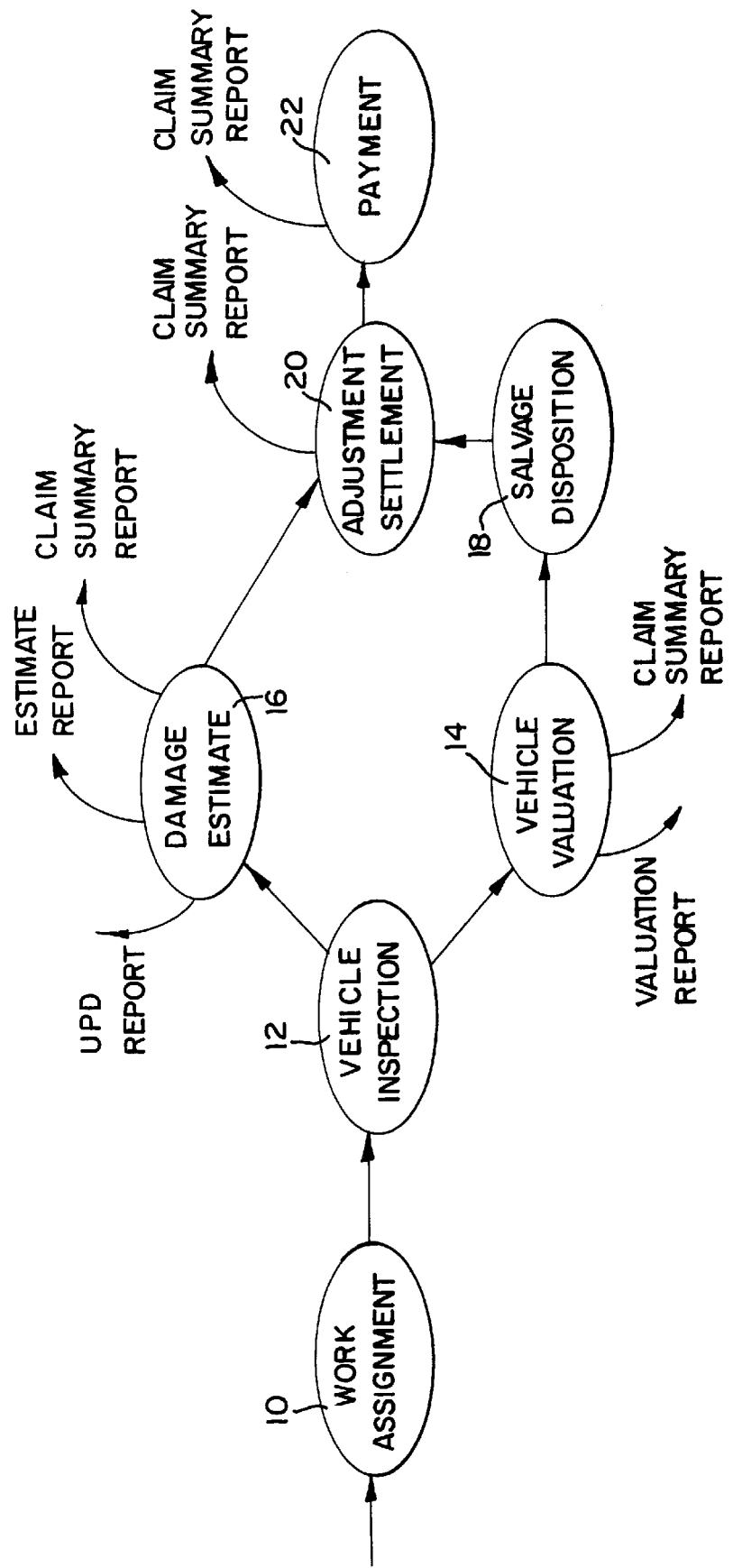
FIG. 1 is a general flow diagram showing the task workflow in a typical vehicle insurance claim.

As shown in FIG. 1, a generic claim processing workflow is illustrated. The claim workflow shown in FIG. 1 is tailored specifically for automobile insurance claims. Other types of insurance such as property or health insurance may also be mapped into the claim workflow shown in FIG. 1. According to a presently preferred embodiment, a work assignment 10 is received by a claims adjuster after an accident has been reported. A vehicle inspection 12 is then conducted to determine the extent of damage to the insured vehicle.

After the vehicle inspection has been recorded, at least two calculations may be made with regard to the vehicle. First, information from the vehicle inspection is used to determine a vehicle valuation 14 which values the vehicle based on several factors including age of the vehicle and prior damage. A damage estimate 16 is also made of the vehicle to attempt to define the repairs necessary to bring the vehicle back to its previous state. If the repair estimate approaches the vehicle valuation, the adjuster may decide to total out the vehicle.

The next step is then to determine salvage disposition 18. Salvage disposition refers to bids made by local salvage parts lots for purchasing the remainder of the vehicle should it be totaled out by the adjuster. The numbers from the damage estimate and from the vehicle valuation, including salvage disposition, are then used by an adjuster who looks at these numbers to determine what type of settlement and/or adjustment 20 should be made. The final step of the claim processing chain is to pay out 22 to the insured the repair costs or the total loss amount.

Figure 2:
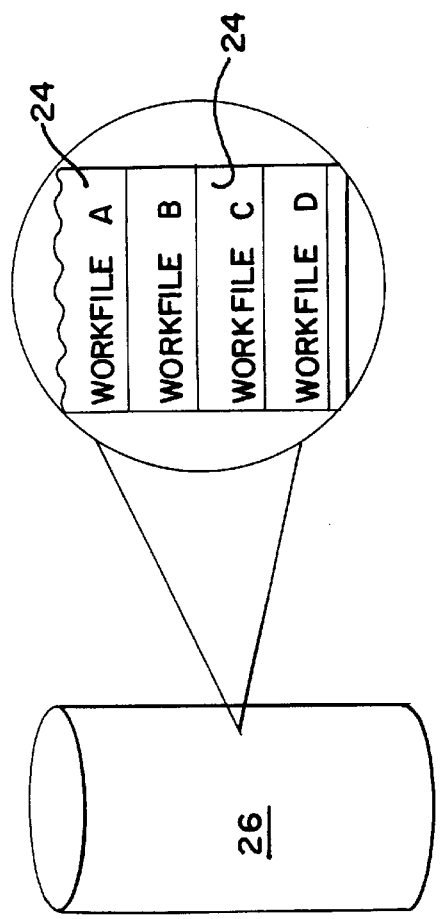
FIG. 2 is a diagram of a memory device containing a plurality of electronic insurance datafiles.

The processing of an insurance claim, as shown in FIG. 1, generates a great deal of data. All the information related to a given claim is preferably contained in a single workfile such as an electronic datafile 24. As seen in FIG. 2, each electronic datafile 24 is preferably stored in a memory device 26 such as a hard disk drive or other commonly known storage device. The datafile is transferable, in its entirety, to remote computers and may be copied in part or in whole to provide status information to insurance company managers, claims office personnel, and auditors.

Another section of the workfile relates to total loss calculations. The total loss calculation involve evaluations based on salvage disposition and present worth of the vehicle based on estimates such as blue book evaluations. Also, settlement information related to rental cars, towing, credit allowance and the like are included in the workfile. An event log logging the date, time and task performed by an adjuster or insurance company employees is included. The event log may contain automated or manually entered events. The event log, which is automatically appended to the workfile, allows supervisors to track and manage claim cycle times. In addition, the workfile holds all notes, form letters, reports and rate tables that are related to the claim the workfile represents.

Figure 3:
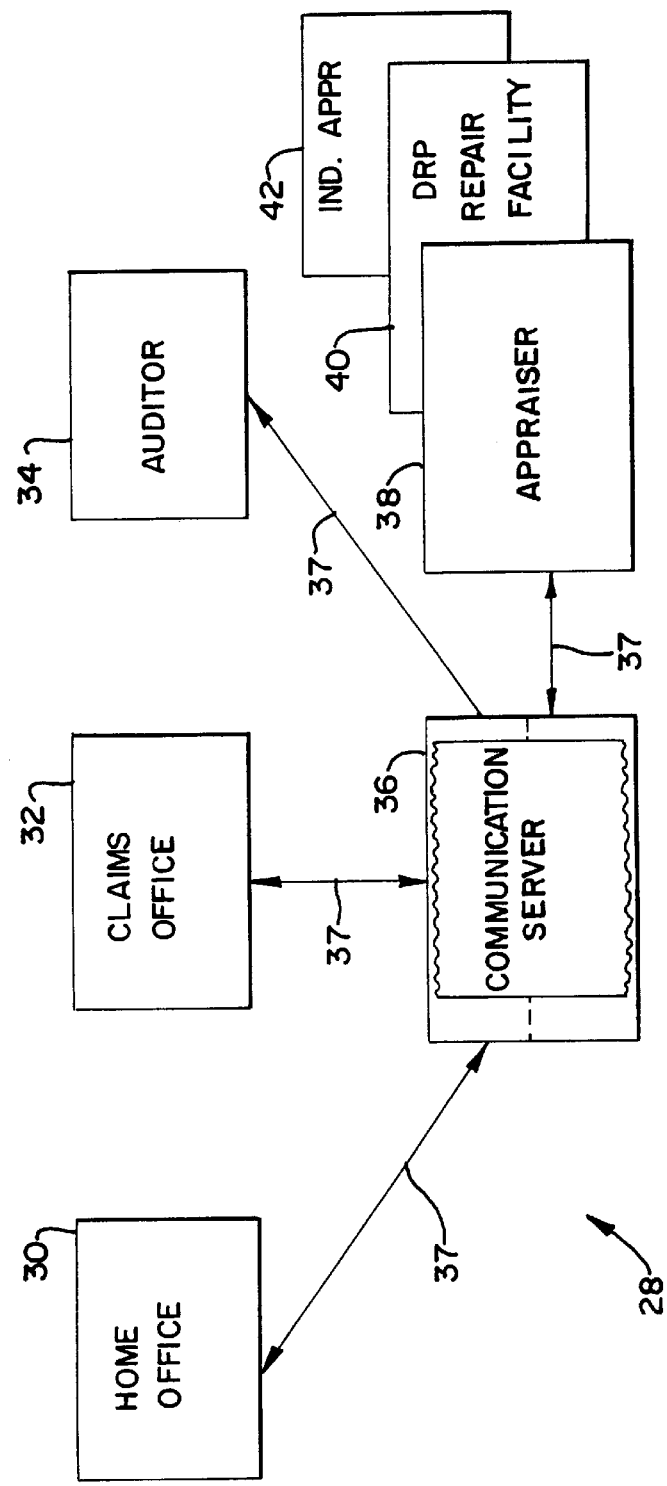
FIG. 3 is an illustration of a preferred system for use in insurance claim processing.

A system 28 for executing a preferred method of managing insurance claims processing is shown in FIG. 3. The system 28 preferably comprises computer terminals or networks at an insurance company home office 30, a local claims office 32 and an auditor 34. Each of these computers is in communication with a communication server 36 over a communication line 37 such as telephone lines or wireless communications facilities. The communication server 36 may be a specialized server dedicated to insurance claim management, such as the EZNET server provided by CCC Information Services, Inc., or a general wide area network provider such as America On Line (AOL). The server 36 preferably has a plurality of flexible memory locations, or mailboxes, for storing insurance datafiles and communications. Computers located at an appraiser 38, direct repair program (DRP) facility 40, or independent appraiser 42 are also in communication with the server 36 over a communication line. The computer of the home office 30 preferably holds the mastercopy of each insurance datafile unless the assigned appraiser 38, DRP shop 40 or independent appraiser 42 is working on the specific insurance claim assignment associated with a datafile.

Each computer in the system 28 preferably has a processor, a display monitor, and memory. The processor, display monitor and memory may be embodied as an IBM-compatible personal computer. The memory may be embodied as a mass storage device. The processor is coupled to the mass storage device and display monitor. The mass storage device may be a hard disk, compact disk, optical disk or other computer storage device. The mass storage device may also be used for archiving data.

The main memory includes a video memory which stores display format information which is displayed on the display monitor. The information stored in the video memory is used to refresh the display on the display monitor. The information may be text, graphics, or a combination thereof. The mass storage device stores a data base of text and graphics images that may be in compressed digital form. The digital data stored in the memory includes a database containing information on a plurality of automobiles including illustrations and replacement costs. The replacement cost, as the term is used here, refers to costs typically encountered for repairing or replacing parts and/or groups of parts of the damaged objects. These costs may include amounts needed for parts, labor, painting, edging, underside, refinishing, etc. The data base may include, for example, the replacement parts, times, procedures and footnotes for automobiles. Both the text and graphics may be stored in compressed form. The compressed graphics may use PCX, TIFF or other graphics image formats.

Figure 4:
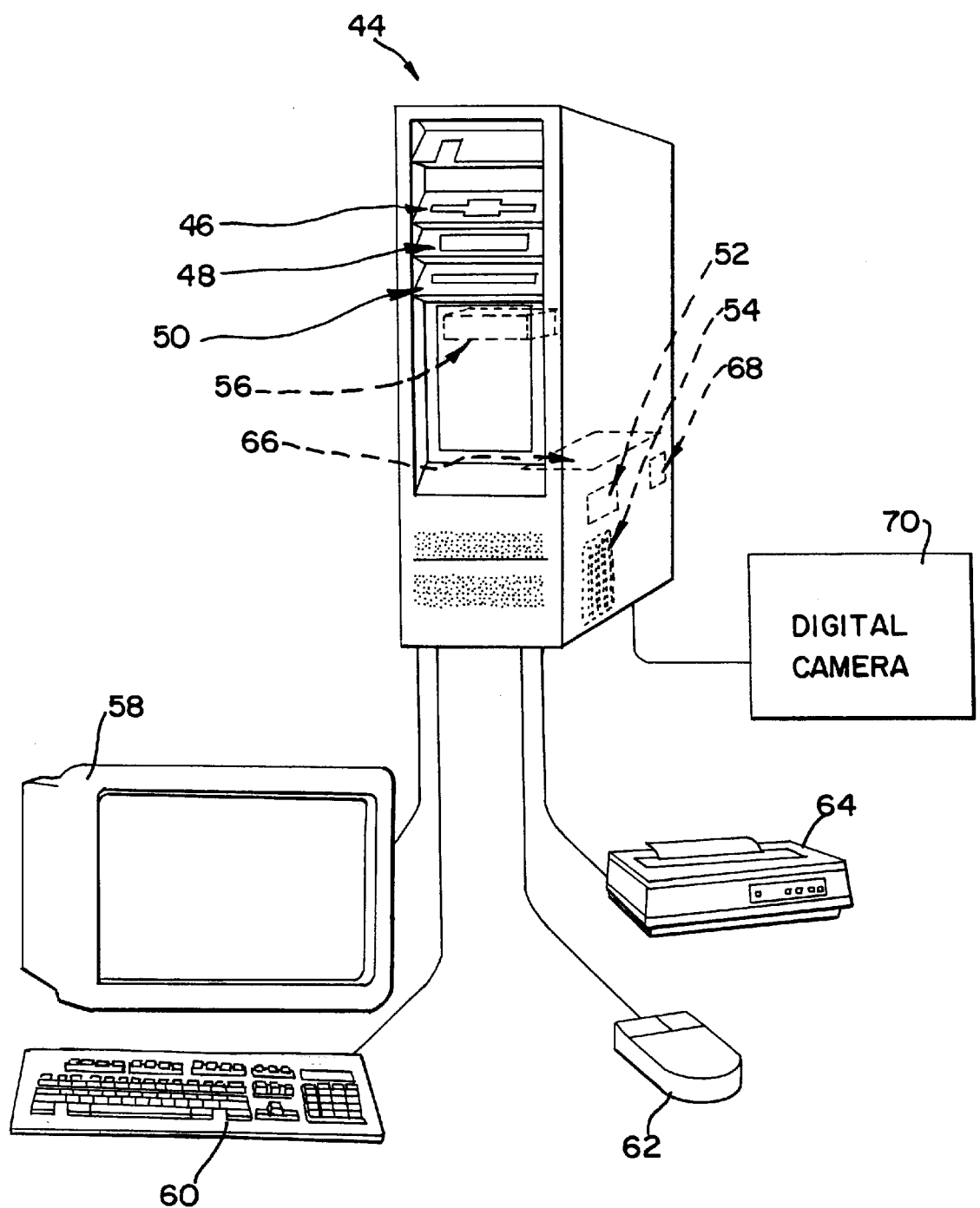
FIG. 4 is an illustration of a preferred single user system for use in insurance claim processing.
Figure 5:
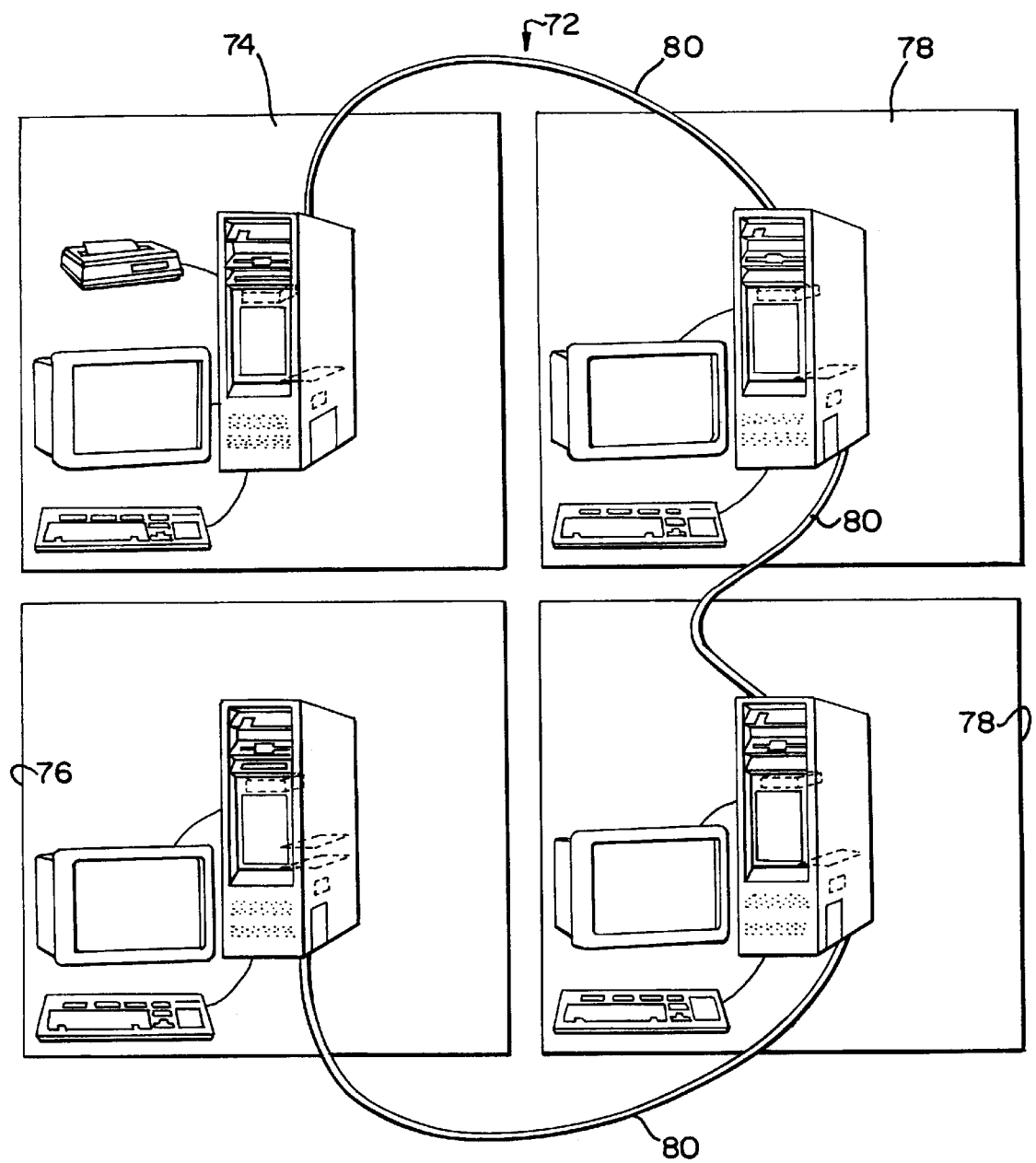
FIG. 5 is a block diagram of a system for use in managing insurance claim processing.

As described above, the computer at each location may be a single user system such as shown in FIG. 4 or a multi-user system as seen in FIG. 5. The single user system 44 may comprise a computer having a floppy disk drive 46, a tape backup drive 48 and a CD ROM drive 50. The single user unit preferably has a processor that may be used in an IBM-compatible personal computer 52 and uses internal memory 54 consisting of at least 12 megabytes of RAM and, optionally, a 256 kilobyte cache of speed enhancement memory 68. A hard drive memory 56 is also preferred. The user of the single user system interacts with insurance claims files via a monitor 58, a keyboard 60 and a computer mouse 62. Other input devices such as computer pens or touch screens may also be used. Optionally, a printer 64 may be used to print out reports. The single user system 44 communicates with other databases and other computers via a modem 66, which may be internal or external, connected to a wide area network over regular telephone lines. The single user workstation may also be a laptop or other portable type computer for ease of use by field appraisers and adjusters.

The preferred system also includes means for inputting a digitized image of the damaged vehicle, to the processor 52. The presently preferred method uses a captured digitized image of the damaged vehicle to verify damage and assist in identifying necessary parts. The image may be taken by an image digitizing device. The digitizing device may be embodied as a digital camera 70 or videocassette camera, or a regular photograph may be processed and scanned into the computer. The digitized image of the damaged vehicle is appended to the workfile and may be sent to the parts supplier and/or the salvage terminal to help identify the part that is to be sent for repair processing, but is preferably used to record and verify vehicle damage. As with the other user input devices described above, the digital camera 70 acts cooperatively with software to record the image in the datafile.

According to a preferred embodiment of the present invention, another computer configuration for use with the present method is shown in FIG. 5. The system shown in FIG. 5 is a local area network 72 connecting several computer workstations. The local area network preferably has a file server 74 connected to a primary workstation 76 and one or more secondary computer workstations 78. The individual workstations and file server are all connected via a communications line such as an ethernet coaxial network cable 80. The file server 74 may comprise a computer having at least one floppy drive of preferably 1.44 megabyte capacity, a CD ROM drive and a hard drive such as a 2 gigabyte SCSI drive. The computer preferably also includes a processor suitable for use in IBM-compatible personal computers, such as the PENTIUM® processor manufactured by INTEL Corp., and an internal memory that may have 32 megabytes of RAM. A network connection such as a network card is also included. The primary computer workstation 76 also may comprise a computer having a floppy drive, a hard drive, a processor such as those suitable for use in an IBM-compatible personal computer, and an internal memory such as 16 megabytes of RAM. Also included in the primary workstation 76 are a network card and a fax modem. On each computer in the network 72, a user views datafiles and other insurance claim processing information through a monitor and can enter and extract data via a keyboard, computer mouse, or pen attached to the computer.

Similar to the primary computer workstation, the at least one secondary workstation 78 also may include a floppy drive, a hard drive, a processor, internal memory and a network card. Additionally, the secondary workstations 78, each may have a keyboard and a monitor with which to interact with the datafiles and claims processing. The local area network 72 shown in FIG. 5 preferably runs network software provided by any one of a number of commonly known manufacturers of network software. For instance, one suitable network software package is NETWARE 3.12 produced by Novell, Inc.

Each remote computer, whether a single user computer or a computer in a local area network, provides an interface for a user to access the assigned or pertinent claim workfile. The user interface not only comprises a video display of monitor, but also includes a universal display screen. The universal display screen, preferably a graphic user interface, displays at least one workfile/datafile in addition to visual objects representative of actions to be taken on a workfile. In a preferred embodiment where the universal entry screen is the graphic user interface described above, an opened insurance claim datafile has a plurality of tabbed sections, each tabbed section representing a separate view of the datafile. A user may access each of the tabs by using a keyboard or other user input means.

Figure 6:
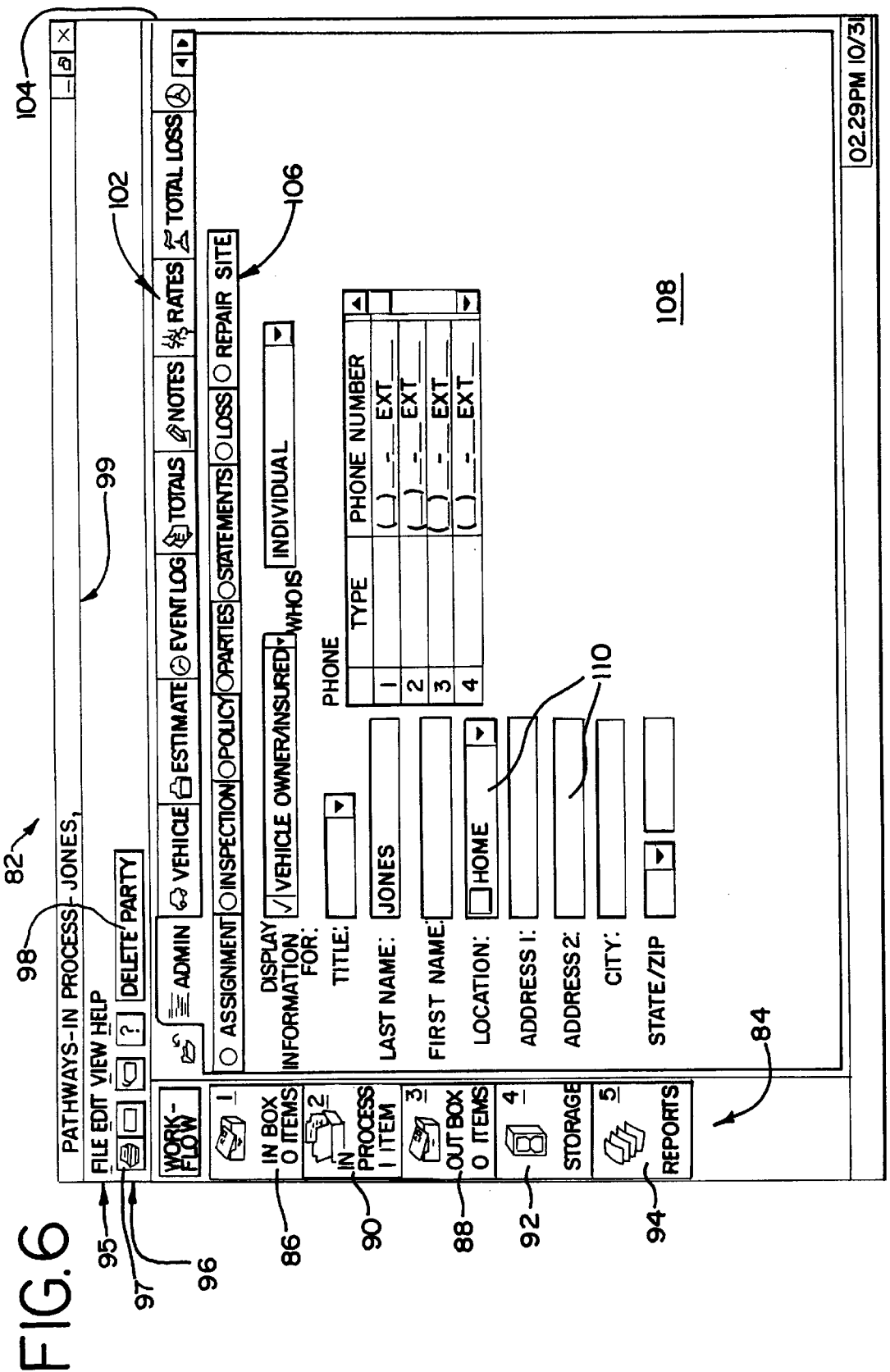
FIG. 6 is a preferred screen from a graphic user interface for use with the system of FIGS. 3 or 4.

As illustrated in FIG. 6, a preferred graphic user interface 82 for use with the method and system of the present invention allows an authorized user to control claims processing workflow for one or more insurance datafiles. The graphic user interface not only permits a user to enter and retrieve information from a datafile, but also permits the user to execute tasks involved in claims processing such as manipulating a plurality of claim datafiles, opening a specific claim datafile and working on estimate calculations or correspondence related to the open file. The interface also provides for communicating with repair facilities and insurance company staff. The graphic user interface may be constructed using known software tools and languages such as VISUAL C++ produced by Microsoft Corp., RATIONAL ROSE produced by Rational Corp., and the IBM CUA Library produced by IBM, Inc.

In one embodiment, the graphic user interface 82 includes a perspective bar 84 having a plurality of user objects representing basic office workflow. The user objects represented on the display monitor mirror the objects used by a typical user in an everyday work environment. Preferably, the perspective bar 84 has an in box 86 for receiving assignments, an out box 88 for transmitting the assignments that have been processed, and an in process box 90 for holding workfiles and information that a user is working on. Access to storage locations, which may be a hard disk drive, is provided through a storage object 92. Report forms are accessible through a report object 94.

The graphic user interface also includes a tool bar 96 made up of objects 97 that allow the user to perform necessary tasks such as printing, and context sensitive buttons 98 that appear on the bar 96 when certain tasks may be required by the screen presently being viewed. According to a preferred embodiment, the context sensitive buttons 98, such as the "Delete Party" button in FIG. 6, will disappear when the screen on the display monitor does not require the option represented by the context sensitive button 98. The interface 82 also includes a menu bar 95 having one or more pull-down menus and a title bar 99, which may include general information concerning the filename of the displayed file and the user's location in the claims processing workflow.

As shown in FIG. 6, the perspective panel 84 may be selected as always visible regardless of what point of the claims processing a user is at. Regardless of whether a user is using a local area network (LAN), a wide area network (WAN) or a stand alone computer, the in box 86 retains all the mail addressed to the particular user. The out box 88, which is located on the same screen as the in box 86, is also essentially independent of the type of network or stand alone computer a user happens to be working on. Mail is sent from the out box whenever a user confirms the completion of the files contained in the out box 88. Both the in box and the out box are connected through network connections described above so that assignments, entire workfiles, and miscellaneous claim information may be passed back and forth. In one preferred embodiment, users do not have individual in and out boxes but are able to filter the contents of a central in or out box so that it may selectively view the contents. In another preferred embodiment, each individual user is assigned an in box containing only those electronic datafiles relevant to the particular user.

The in process box 90 is used for those workfiles a user is working on. A workfile remains within the in process box 90 for as long as it takes to complete the various steps or transactions required for the particular work file. This time will of course vary with the complexity of the claim that the workfile represents. When the in process icon is selected, the graphic user interface displays the number of items or work files in process, with each workfile appearing as a folder in the main screen area. Each folder is identified by the insured's name; make of the vehicle; date; and job number assigned. To open a particular workfile with a mouse, the user can either double-click on the desired folder or use the "open" button provided near the top of the screen. Keyboard access to workfiles may be achieved through use of arrow keys, the space bar and the "enter" key.

Within the in process box, an individual workfile opened for work on a display monitor is shown in FIG. 6. The workfile preferably comprises a plurality of individual sections represented by tabs 102 that designate the contents of that section. In one preferred embodiment, a section tab extension 104 is included to allow for extra sections to be referenced without cluttering up a viewer's screen. Within each of the sections of the workfile, a frame switching button bar 106 having a number of frame switching buttons is included.

Once a particular workfile in the in process box has been opened, the user is provided with the overlapping tab format, visible to a user as overlapping folders, or tab icons, summarizing categories of information applicable to the workfile. As described above, the section tabs 102 may include text and graphics designations for subjects such as administrative information, vehicle data, total loss information, events, estimates, totals, notes, correspondence, salvage, and rates. A user may view or manipulate the data accessible in each of the tabs.

Administrative information stored in the "ADMIN" tab includes several frames 108 of information accessible through the frame switching button bar 106 inside the tab. Preferably, the information comprises assignment information, inspection information, policy information, party information, statements, loss information, and repair site information. Assignment information includes items such as the claim number, the date the claim was reported, the date the claim was assigned, and information on who received the assigned claim, e.g., the names of the insurance company, appraiser and adjuster, as well as claim office location. The example in FIG. 6 shows the "parties" frame selected. This selection reveals a number of text fields 110 for entering or viewing name, address and telephone information.

By accessing the inspection information frame with the frame bar 106, a user may review or update appointment and inspection site information, and rental car information if applicable; information necessary to specify inspection scheduling and site is enterable using the graphic user interface. The policy information frame includes type of coverage, name of insured and/or claimant, policy number and provider, deductible amount, expiration date, and other relevant details.

As shown in FIG. 6, the party information frame includes name, address and driver information on the vehicle owner, lien holder and/or the insured. The frame for statements includes information on the party making the statement, the type of statement, and the statement itself. Loss information includes type of loss, relationship between vehicle owner and claimant, and specifics about the time and nature of the loss itself. Repair site information includes specifics on the repair site such as location and state or federal licensing, as well as repair agreement terms and amounts. The categories of information just enumerated are enterable by the user using the graphic user interface in combination with input devices such as a keyboard, pointing devices such as a mouse or pen, and software based interface logic.

The vehicle data tab includes general descriptive information, options, and damage. Vehicle data also could include categories for additional considerations and condition. General descriptive information may be entered by the user such as vehicle identification number, year, make, type, body style, engine size, odometer reading, color, etc. A vehicle options selection allows the user to specify whether the damaged vehicle was equipped with a particular type of sunroof or other roof type, to specify whether it was equipped with power accessories, and to identify the type of transmission. Other options may also be included. Damage information includes the car's overall condition, i.e., driveable or not; areas of primary and secondary impact; and additional damage particulars. Again, the categories of information just enumerated are enterable by the user using the graphic user interface.

The total loss information tab contains information on total loss valuation such as general vehicle values by year, model, etc. A user has the option to request a more complete total loss valuation by transmitting a request for a valuation to a provider and transmitting a copy of the pertinent vehicle information with the request. The total loss value is an estimated value assigned to a damaged vehicle to generally determine if the cost to repair exceeds the total value of the vehicle. Typically, if an estimate to repair exceeded the estimated total loss value, then the insurance company usually gives the insured a money settlement and the car is salvaged. The settlement value may be a percentage of the total loss, due to a price of selling the total vehicle to a salvage parts dealer. If the total loss value were greater than the estimate of the repair, then the decision may be to repair the damaged vehicle. Thus, the total loss value is used to help determine whether a repair shop gets a job, or whether an owner of a vehicle gets a dollar settlement value for the vehicle. In a preferred embodiment, a user is informed when a repair estimate being prepared approaches an estimated total loss value. At this point, the user may send out a request for a specific total loss valuation from a third party provider that will calculate the specific value of the car.

As seen in FIG. 7, the graphic user interface also permits ease of access to information and calculations from traditionally separate insurance processing modules. For example, a total loss calculation may be directly juxtaposed with a vehicle damage estimate on the same computer screen in the "Totals" tab when the "Settlement" frame is selected. Information entered through the graphic user interface into a workfile automatically updates related calculations for the different insurance claim process used within the workfile. All aspects of the workfile in calculations regarding an insurance claim can be accessed through a single user interface. In other words, any of the tasks involved in processing an insurance claim may be addressed through the graphic user interface, examples of which are seen in FIGS. 6 and 7. All the steps shown in FIG. 1 may be managed using the different functions presented to a user in the graphic user interface.

The user interface acts to seamlessly connect the different functional modules used to calculate and process discrete steps of an insurance claim processing task. Structurally, each task may be defined as a module which connects through the interface a user to the appropriate data base or communications channel. This open ended architecture allows for expansion at a later date to include greater processing or workflow capability without the need for additional computer hardware, within the same graphic user interface, and therefore without the need for a user to learn a new software program.

Figure 8A:
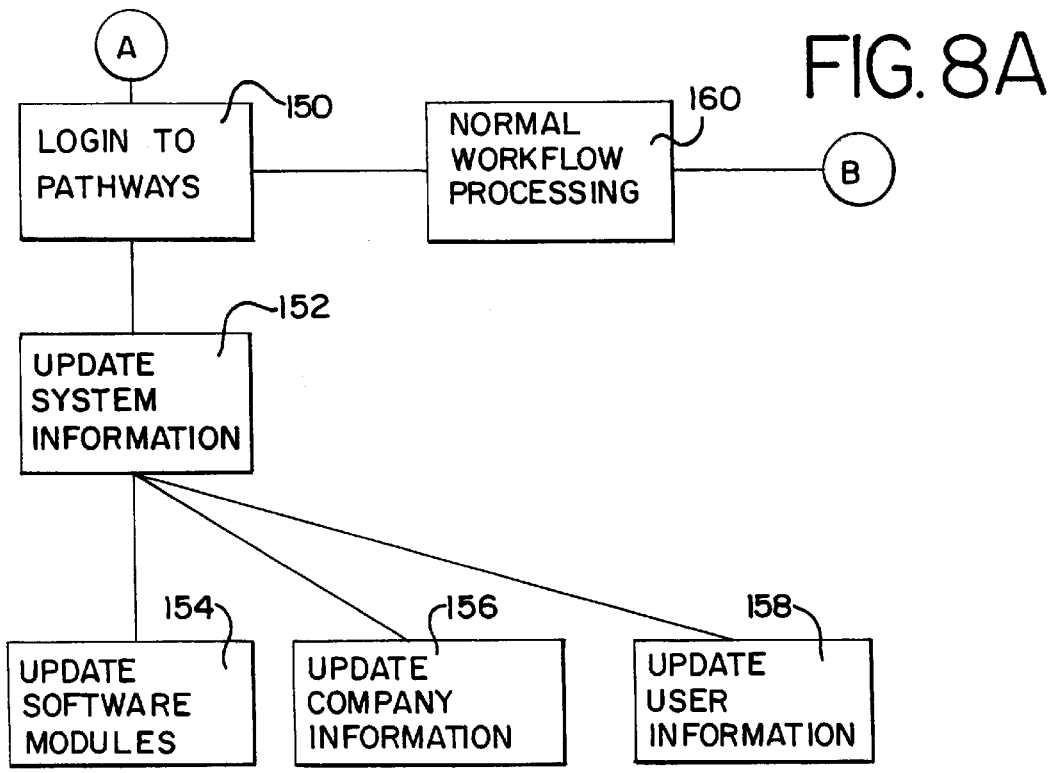
FIGS. 8A–8L are flow diagrams illustrating a preferred method for managing insurance claim processing workflow.
Figure 8B:
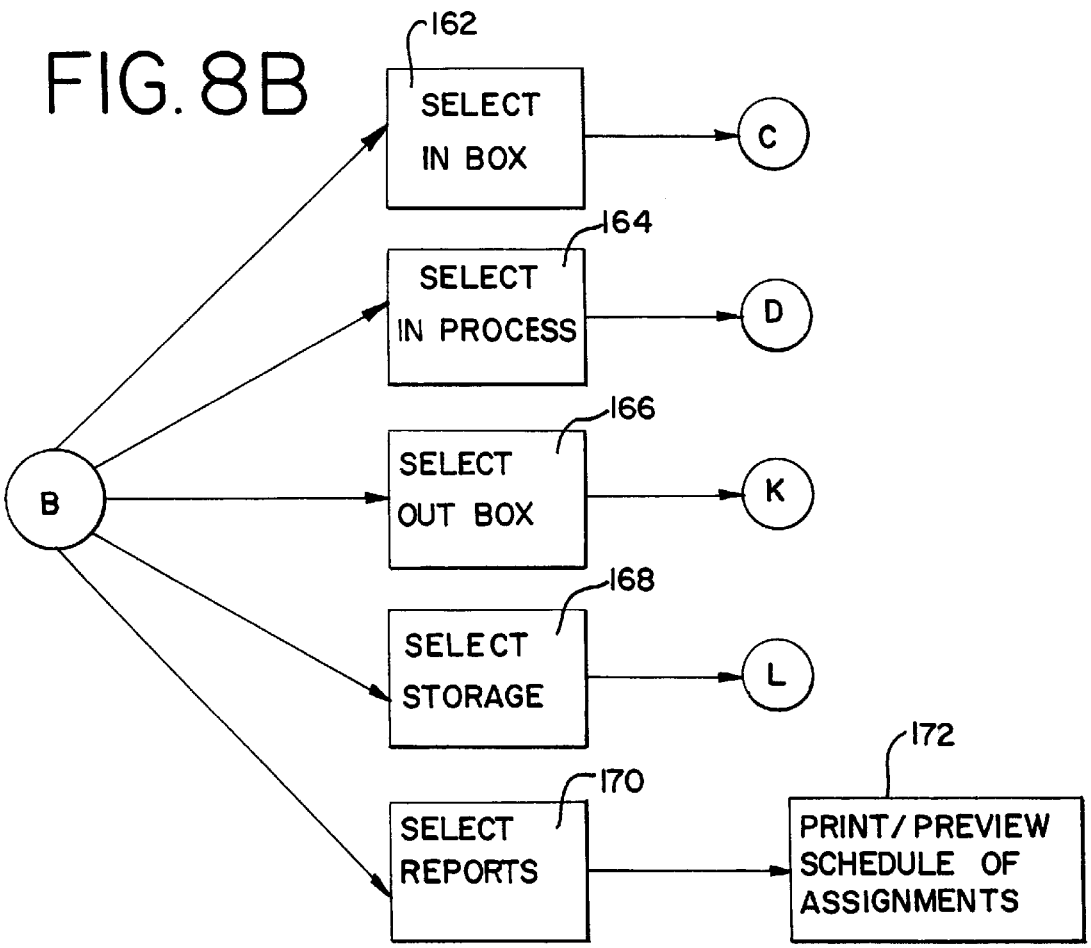

FIGS. 8A through 8L illustrate the preferred method for processing an insurance claim from inception to final settlement as was shown in FIG. 1. The presently preferred method may execute, but is not limited to, the example of insurance claim processing workflow shown in FIG. 1. One presently preferred software embodiment is included in the attached Microfiche Appendix. Referring to FIG. 8A, using a remote computer or working from a workstation in a multi-user environment, a user first logs in 150 to the computer, entering the user name and other identification. At this point a user has two options. First, the user may update system information 152 by updating the software modules 154, updating company information 156 or updating user information 158. The step of updating software modules 154 refers to entering a setup menu to, for example, customize the directory structure of the graphic user interface. Within the setup menu, company information such as a list of approved repair facilities may be updated 156. Also within the setup window, user information related to user identifications and security access may be updated 158.

The second option is to begin normal workflow processing 160 by manipulating the perspective panel 84 in the graphic user interface 82 as described above to either select the in box 162, the in process box 164, or the out box 166. Alternatively, a user may choose to store, or view stored information 168 or print out reports on specific workfiles 170. If the user chooses to select to print out certain reports the user may check a print preview 172 of specific types of forms to print out.

Figure 8C:
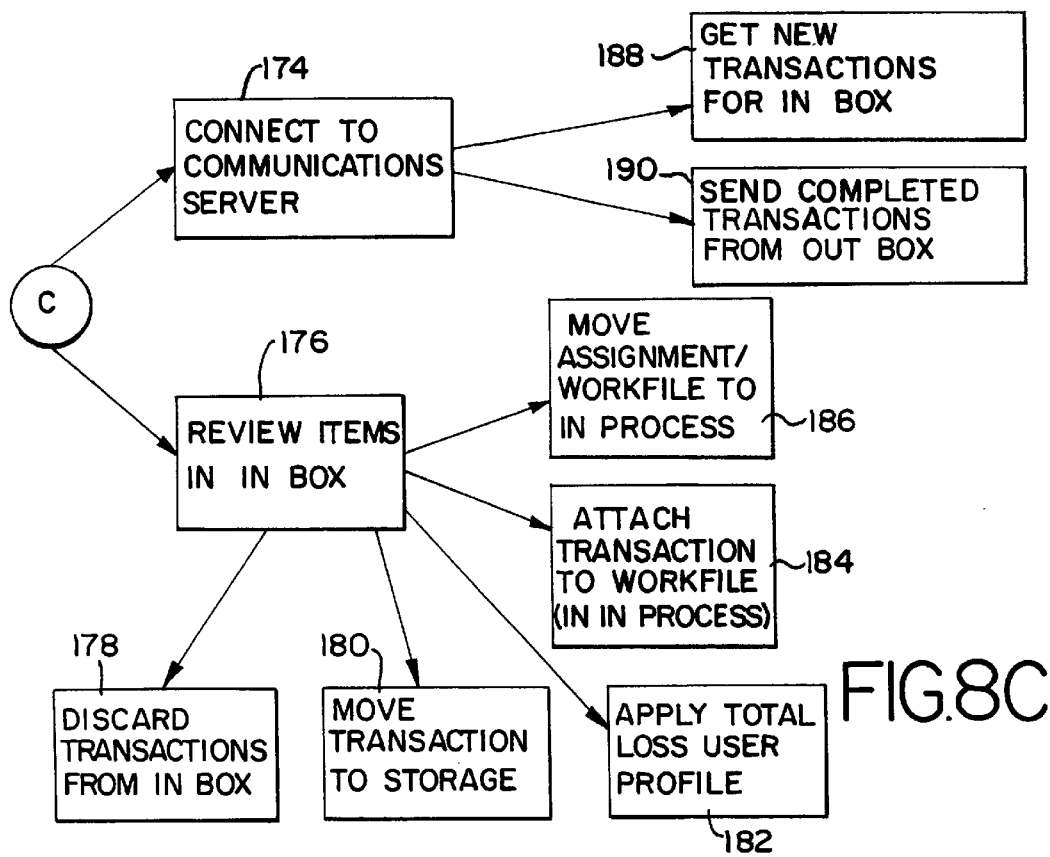
Figure 8D:
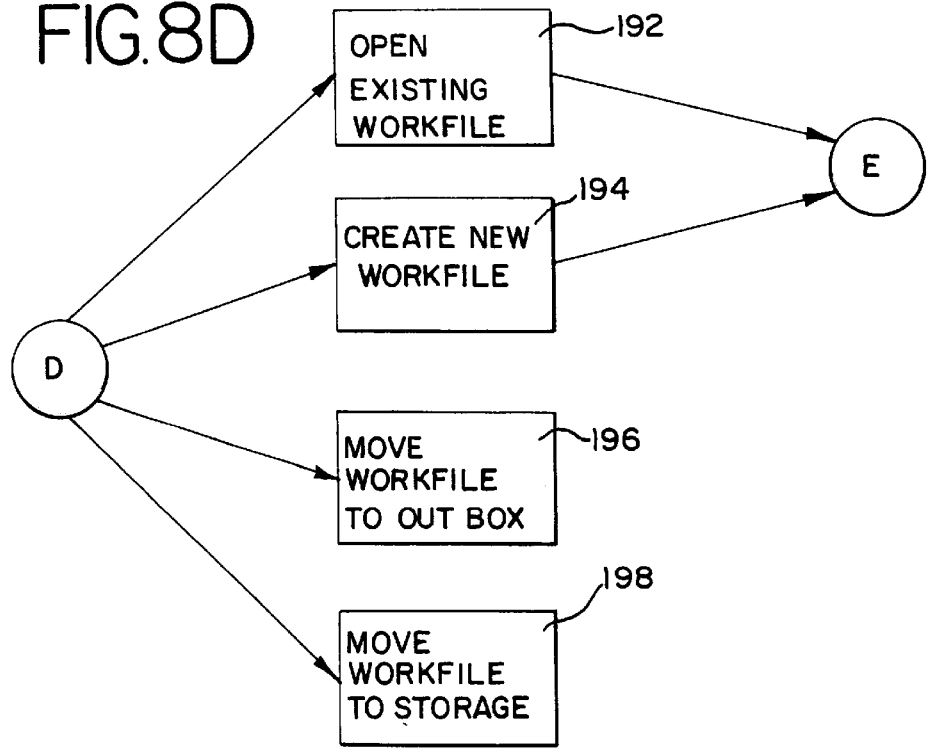

If the user chooses the in box selection the user then, as shown in FIG. 8C, has the option to either connect 174 to a communications server as described above or to review 176 the current items that are residing in the in box. If there are items to review in the in box, the user can discard 178 transactions from the in box which are no longer necessary or move 180 a workfile or other transaction to storage locations such as a memory in the stand-alone 44 or network computer 76.

Other options a user has while viewing items in the in box are to apply 182 a total loss user profile, attach 184 the transaction in the in box to a workfile in the in process box, or move 186 the assignment or workfile from the in box to the in process box. The transaction in the in box may be items of information, such as a total loss valuation response received from a home office computer over a network as described above. Also, the transaction may be a digitized image of the damaged vehicle transmitted from the repair or inspection facility inspecting the insured's automobile. A user may simply move the information into the appropriate workfile by dragging the icon from the in box to the in process box or using the pull down menus on the graphic user interface to merge the information onto the workfile. A user can implement the same technique to move 186 an assignment or workfile to the in process box.

New assignments can be obtained while a user is in the in box. The user may connect 174 to the insurance database at the home office over a modem or network to get new transactions 188 assigned to the user in the in box. Completed transactions are transmitted 190 from the out box to the home office or to another designated destination. Preferably, the method utilizes TCP/IP to format and send data over the system 28 between computers.

Referring again to FIG. 8B if the user selected the in process box on the user interface, the user may then (FIG. 8D) open 192 an existing workfile on an insurance claim and execute the required administrative or repair estimating tasks. The user may also create 194 a new workfile. The new workfile may be created from a received assignment. As with the in box, the user may manipulate workfiles by moving 196 a workfile to the out box that has been completed or storing 198 a workfile for later reference. By opening the existing workfile or dragging a workfile from the in box to the in process box the user can then substantively alter and amend work necessary on the claim.

Figure 8E:
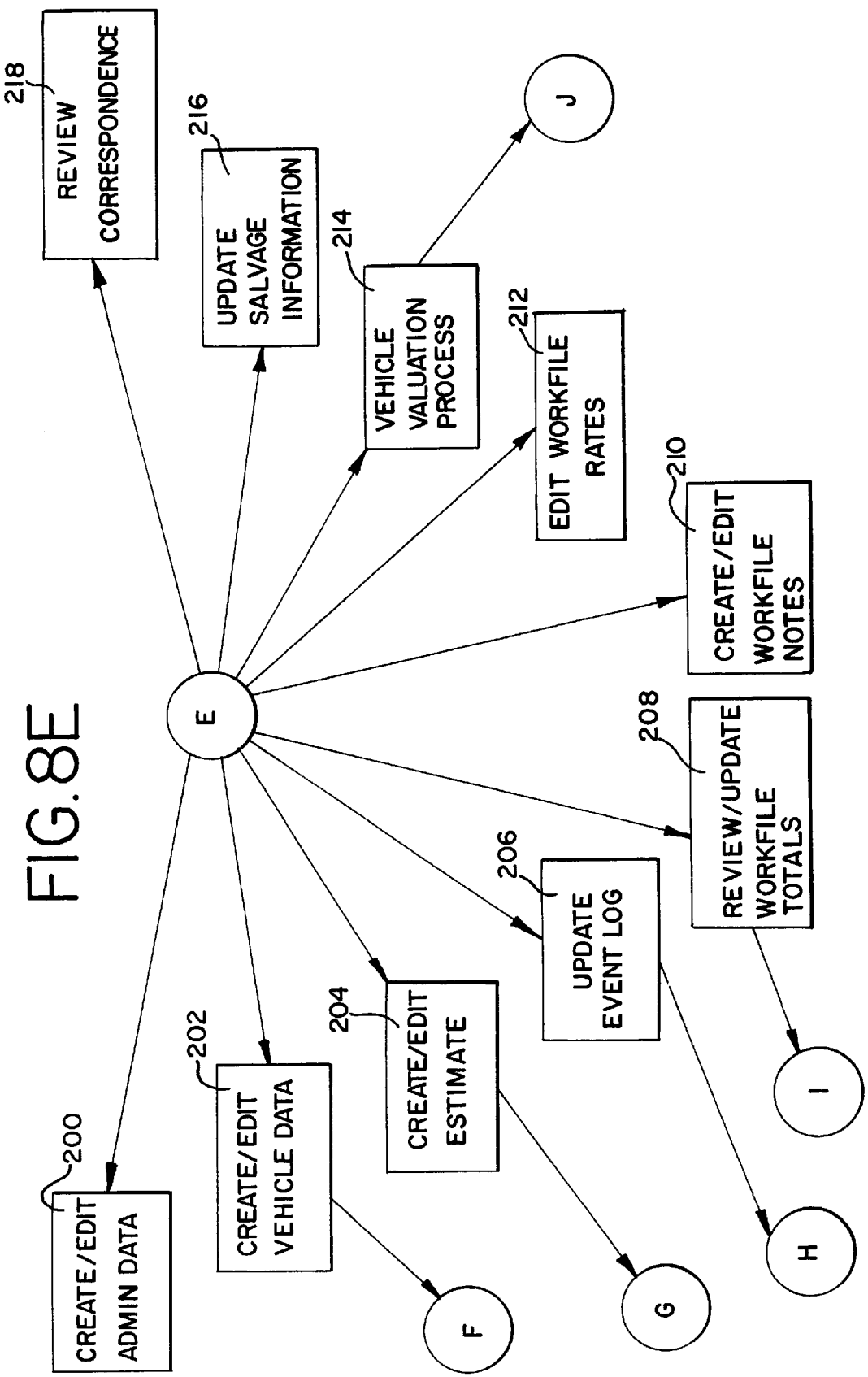

When an existing workfile is opened or a new workfile created, the user may next begin substantive work on the workfile. As shown in FIG. 8E, all of the various tabbed sections in a workfile as described above are available for alteration and amendment. Specifically, the user may create or edit administrative data 200, create or edit vehicle information 202, create or edit an estimate of damage 204, update an event log 206, review the totals in the workfile 208, add to or edit notes 210, edit labor rates in the workfile for the various approved repair facilities 212, begin a vehicle valuation process 214, update salvage information 216 or simply review correspondence 218. In a preferred embodiment, each of these tasks may be accomplished through the graphic user interface described above by selecting the appropriate tabs and frame switching buttons on the computer screen.

Figure 8F:
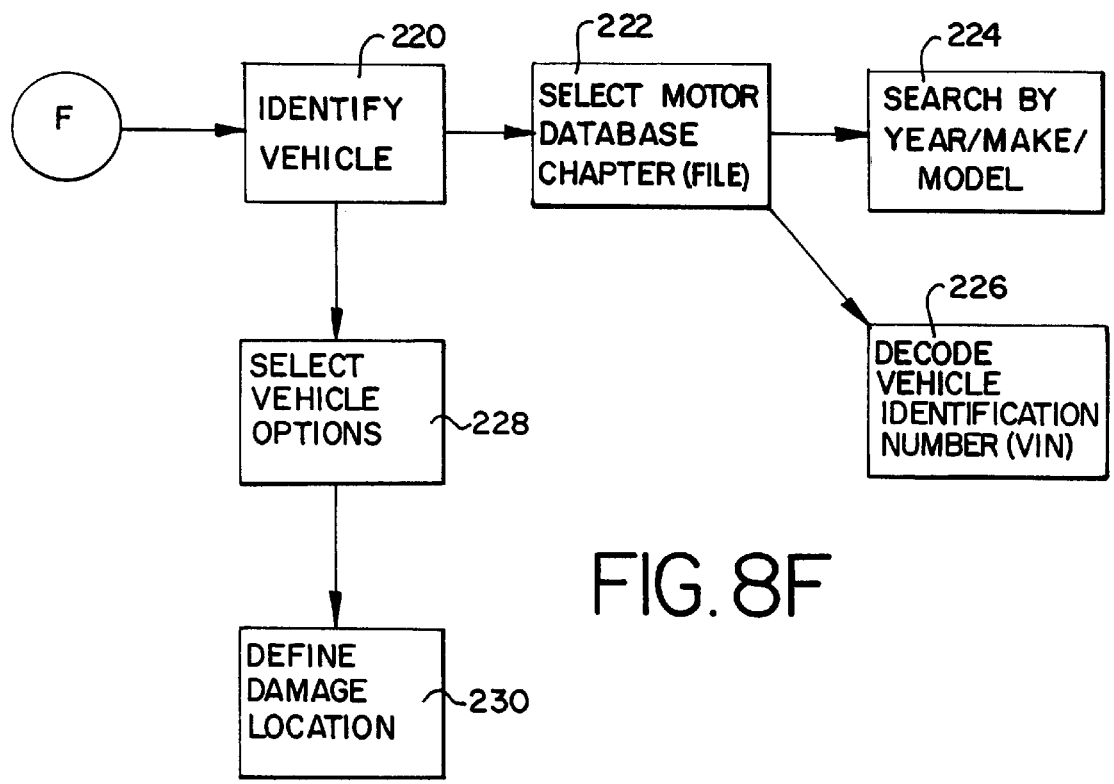

As seen in FIG. 8F, when a user is creating a workfile for a specific claim the user begins by entering vehicle identification 220 into the workfile via the keyboard. After entering the vehicle identification data, the system automatically selects a database 222 from which to access parts lists and values for the particular vehicle. Within the database a search may be made by year, make and model of the vehicle 224 or the user may decide to have the vehicle identification number (VIN) decoded 226 in the database. The VIN number is a unique number assigned to each vehicle manufactured and also contains standard information that identifies the appropriate manufacturer make and model. Once the vehicle identification has been made and the appropriate parts database has been selected for that make model and year of the vehicle a user may select specific options available for that vehicle 228. After the proper identification and selection of options on the damaged vehicle have been made the user defines damage location 230 on the vehicle. The damage locations are defined using an illustration of a generic automobile on which number designations, corresponding to generally known areas of a car, may be selected by the user to identify the primary and secondary damage areas.

Figure 8G:
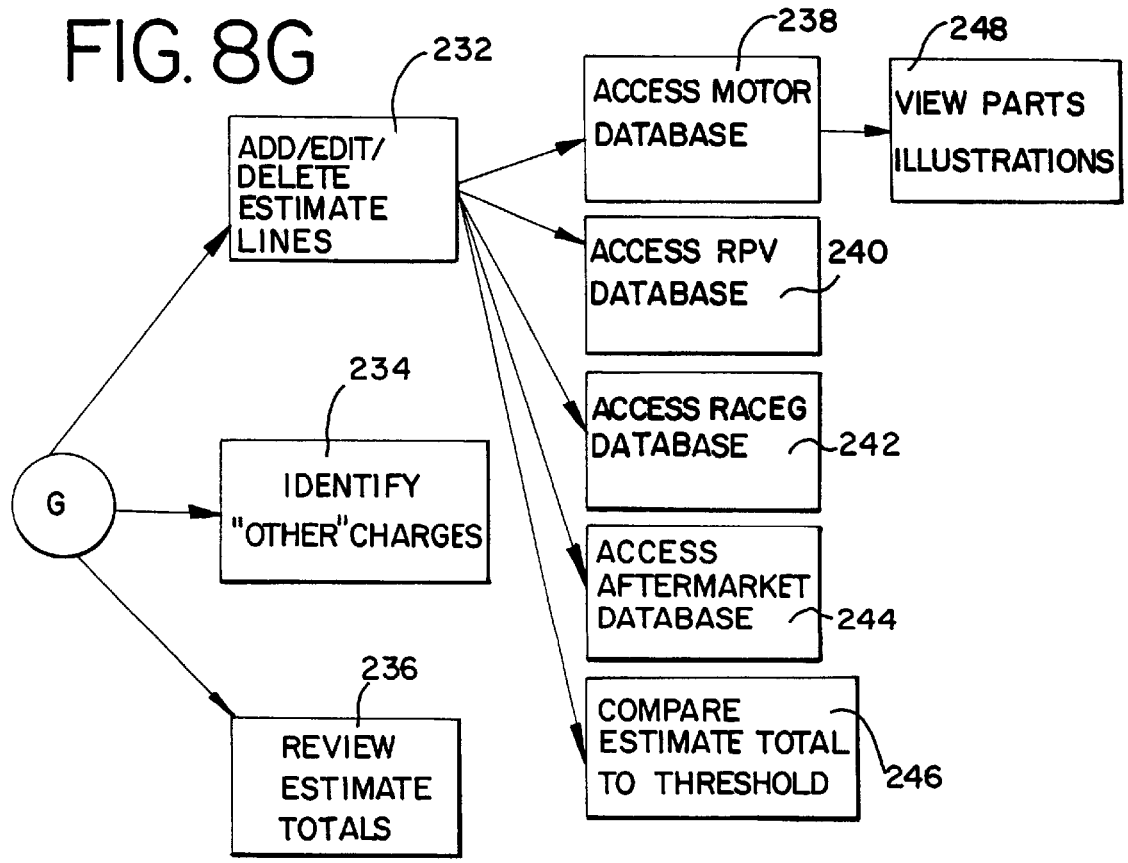

After creating or editing vehicle data, the user can go into the estimate tab of the workfile to create or edit an estimate. As shown in FIG. 8G, a user can either change estimate lines within the estimate 232, identify other charges such as towing or storage fees 234, or simply review the estimate totals for the car 236. When a user is editing or adding information to the estimate, several databases are accessed automatically. Preferably, these databases are stored in a memory device such as a hard drive attached to the computer a user is using. In one preferred embodiment the user may access an original equipment manufacturer (OEM) part database 238, a recycled part/salvage part database 240, a labor cost database 242 and an aftermarket part database 244. Suitable commercially available databases for these four databases are the MOTOR database put out by Hearst Corporation, the recycled part valuation (RPV) database of salvage parts compiled by CCC Information Services, Inc., the recycle assembly crash estimating guide (RACEG) developed by Hearst Corp, containing labor rates, and an aftermarket parts database compiled by CCC Information Services, Inc. The user may also compare the total estimate to a threshold value 246.

The system a user is working on preferably has graphics capability to show a simple parts illustration of the parts being selected from the MOTOR database. The list of groups of parts might include, for example, main parts groups such as: front bumper; frame; grill and lamps; fender and lamps; engine, transmission and axle; wheels and front suspension; front door and rear door; steering; trunk lid; rear body and lamps; fuel systems; rear suspension; rear bumper; and interior trim.

The user has the option to select, using a user input device such as a mouse, keyboard or pen, a group of parts from the parts list. The display monitor displays a parts description from the data base corresponding to the selected parts group. For example, if the front bumper is selected as the parts group, then the display presents the user with parts comprising the bumper such as a face bar; rubber strip; guard; extension; support; filler; molding; license bracket; and energy absorber. Any number of parts can be selected for repair from a particular group of parts, and any number of groups of parts may be selected.

The user may select to view 248, a parts illustration showing a parts assembly with individual parts numbered. The illustration is preferably on the same screen as the textual description of the parts. Throughout the estimate process a user may be prompted by the system that the total cost of repairing the vehicle is approaching a threshold total value for that vehicle. The threshold total valuation number is preferably derived from generic information on the model and year of car being processed. If a specific total valuation is desired then the user must request a custom total valuation report from a third party database provider such as CCC Information Services, Inc.

Figure 8H:
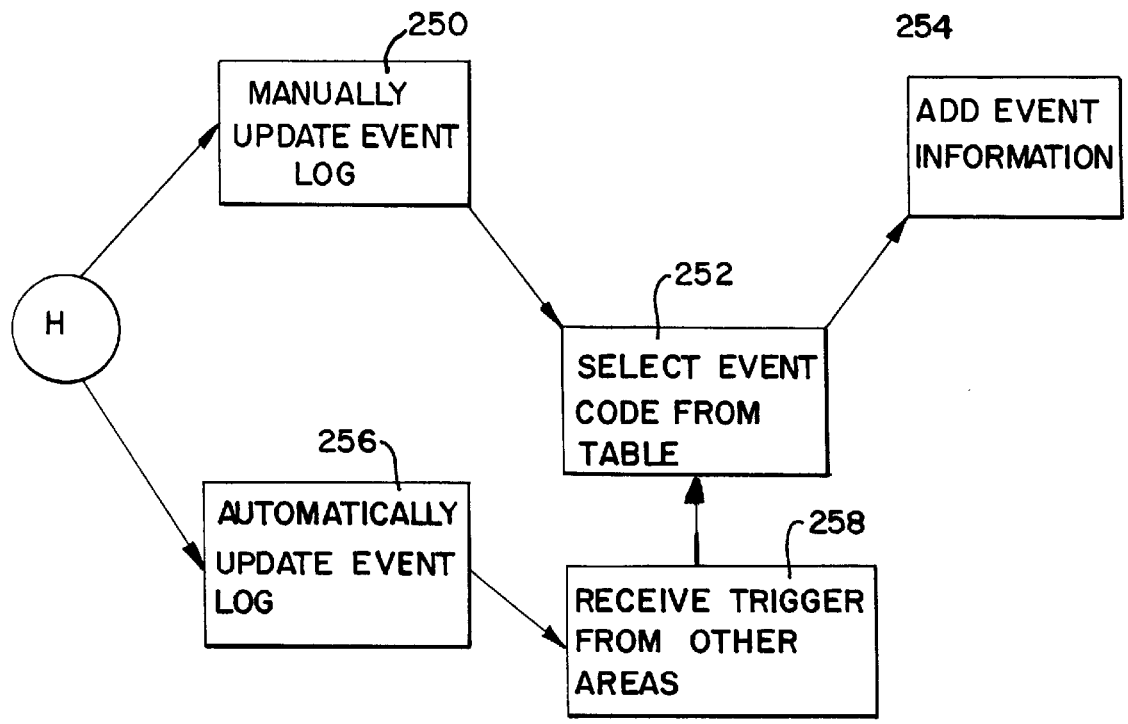

Referring again to FIG. 8E and the choices available to a user, an event log is automatically and/or manually updated 206. As shown in FIG. 8H, user may manually update 250 the event log by selecting an event code from a table 252 and then adding 254 specific event information to an electronic note pad attached to the workfile. Several events are automatically updated 256 simply by activation by a predetermined trigger 258 that operates when certain tasks have been completed. The automatic updates may be configured by an authorized user.

Figure 8I:
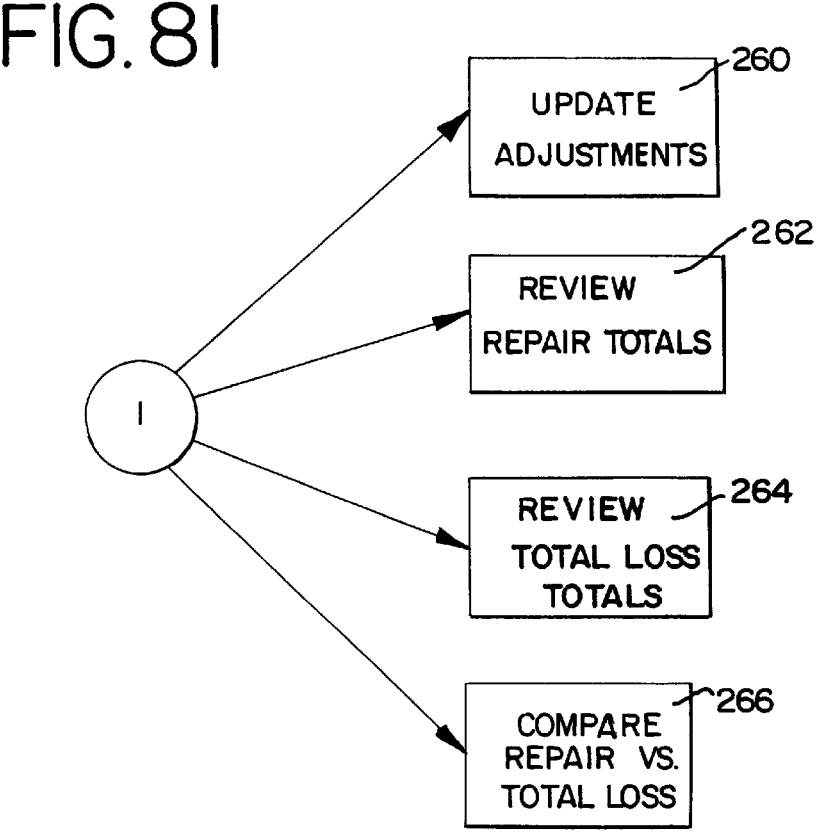

Updated workfile totals on the estimate that has been worked on or the total valuation that was requested are available for viewing and editing by the user 208. As shown in FIG. 8I, the user that selects the totals tab in the graphic user interface of a workfile may update adjustments to the estimate 260, review repair totals 262, review the total loss values 264, or compare the repair and total loss values 266.

Figure 8J:
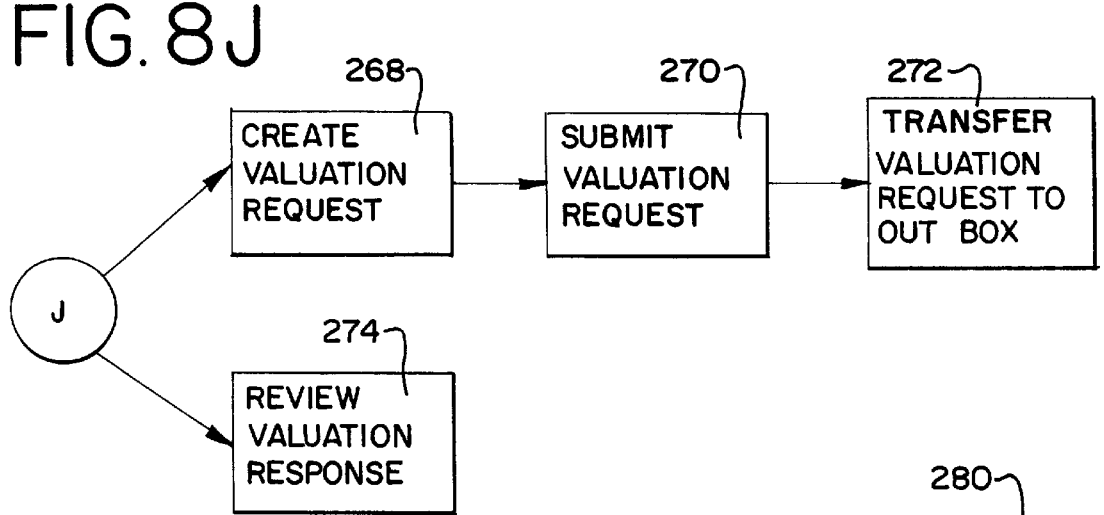

Within the total loss valuation tab of the user interface a user can access entry fields to organize a valuation request. The steps a user takes in creating and viewing total loss calculations are shown in FIG. 8J. Within totals tab of the user interface, a user can create 268 a valuation request including all the pertinent information a third party database company needs to create the specific total loss valuation. After entering all the necessary data, a user then submits a valuation request 270 for completion. The valuation request is preferably transferred 272 to the outbox where it will be sent out over the system described above to be handled by a third party service provider. Total valuation results are received over the same communication network in the in box for the user and may be reviewed 274 by the user after accessing the in box and merging the data in the claimed datafile. The presently preferred method saves a user time by automatically transferring all files, whether from the out box or to the in box, when the user connects to the communications server via modem.

Figure 8K:
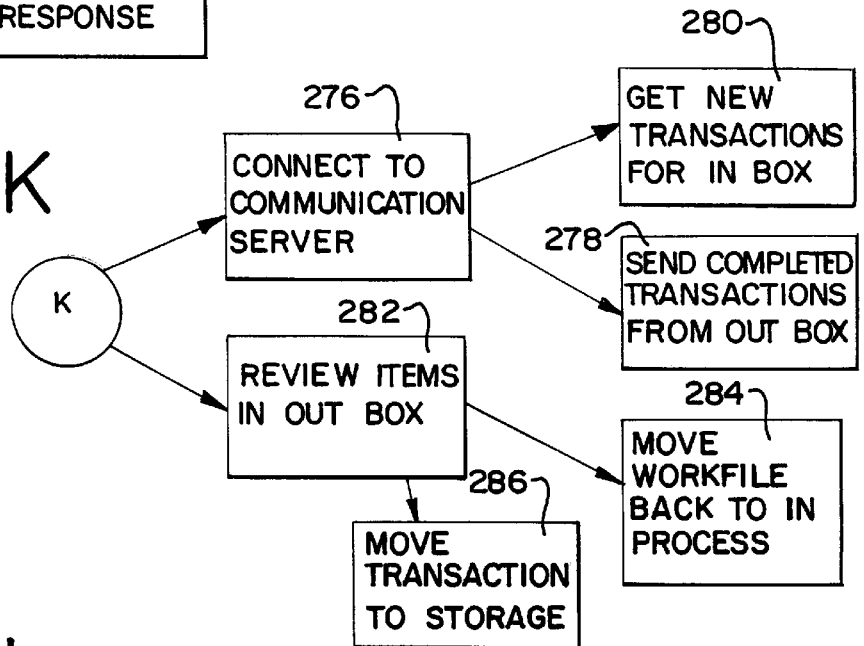

Referring again to FIG. 8B, a user selecting the out box from the perspective panel that shows the overview of workflow has several communication options with the system. As shown in FIG. 8K, in the out box the user may directly connect 276 to a communications server, such as EZNET, via modem. Although typically an out box transaction is sent 278 out from the out box, the connection to the communication server is bi-directional to save time so that new transactions are automatically brought into the in box 280 as discussed above. Items in the out box may alternatively be simply reviewed 282, moved 284 back into the in process box if determined that they need to be modified, or moved 286 into storage for future reference by the user who may be a repair facility that keeps long term records on work done.

Figure 8L:
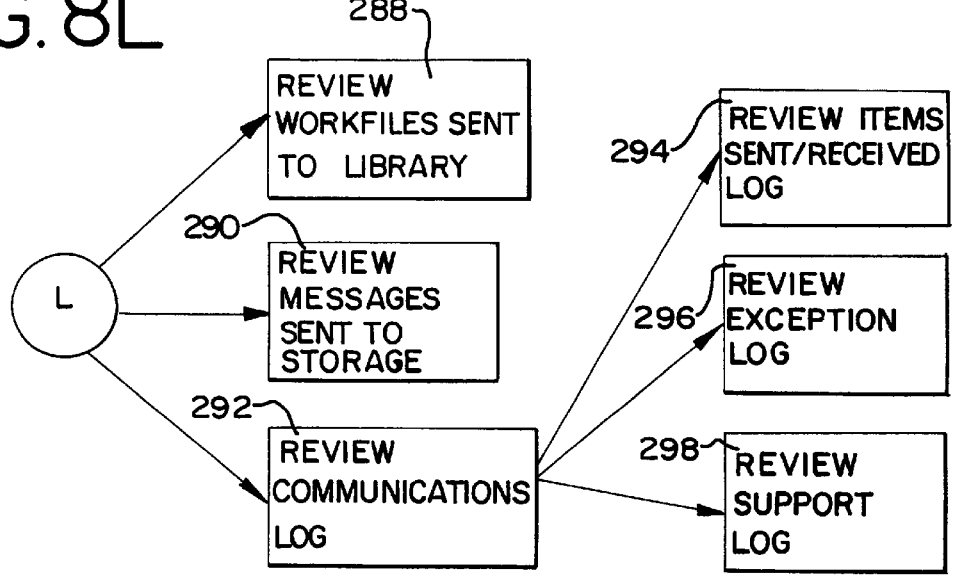

Multiple storage options are available to a user as is shown in FIG. 8L. Selection 168 of the storage icon on the perspective panel 84 allows a user to review any and all related transactions in files stored in attached storage memory devices such as an internal hard drive or other type memory device. A list of workfiles that are sent to an insurance company library after completion may be viewed 288, a list of messages that has been sent to storage may be reviewed 290, and a communications log for all communications that have taken place between the remote computer and other computers may be viewed 292. Typically several types of communication logs are kept at the user's computer and the user may review items in a received logs 294, view an exceptions log 296, or review 298 the support log.

As described above in FIGS. 8E, 8G and 8I, the method of the present invention may include the steps of comparing repair costs using original equipment manufacture (OEM) parts from the car manufacturer, repair costs using after-market parts from some other supplier, and recycled parts costs. When considering recycled, or salvage, parts, the location of these parts may vary; therefore it is preferable for the computer data base provider to communicate with repair shops and salvage junk yards that can provide a salvaged part list at a particular price and location. This salvage information can then be updated and provided to users on a regular basis.

A more detailed example of a comparison of original manufacture parts after market parts and recycle parts is illustrated in FIGS. 9 through 12. In FIG. 9, when the estimate tab is selected in the user interface, an estimate display 300 is shown to a user on a computer screen. The screen has the individual parts that have been selected by the user for replacement or repair and also the parts and their part names and values. The selection by user of an OEM part from the parts database display 302 shown on the screen will, in conjunction with selecting a comparison button, bring up any available equivalent recycled parts.

The recycled parts are shown on another screen which is presented to the user and the user may highlight a desired part and labor times for use in the estimate calculation being prepared. FIG. 10 illustrates the recycled parts selection screen 304. The recycled part screen 304 will only show parts that are available for the vehicle, and thus may not have all the parts necessary for a repair. In the recycled part screen 304, the user is presented with part, labor and assembly information accessed from the recycled part database preferably stored in a hard disk drive attached to the user's computer.

FIG. 11 shows the estimate screen after a recycled part has been selected and a user decides to add the recycled parts to the estimate by selecting the "add to estimate" button on the user interface (FIG. 10). In the example shown, new estimate lines 306 for the selected recycled door are added to the estimate. The added lines 306 include the cost of labor and individual parts necessary to incorporate the recycled part in the repair.

As seen in FIG. 12, once the user has selected the replacement parts necessary from the original equipment manufacturer list database the user may select a comparison of all three possible replacement parts whether OEM recycled or AM parts. Repair cost, to repair the parts that were damaged in the accident, are also appended to the estimate comparison. In this way, a user can see instantly the comparison of different methods and parts to determine the best course of action to take in settling a claim.

Figure 15:
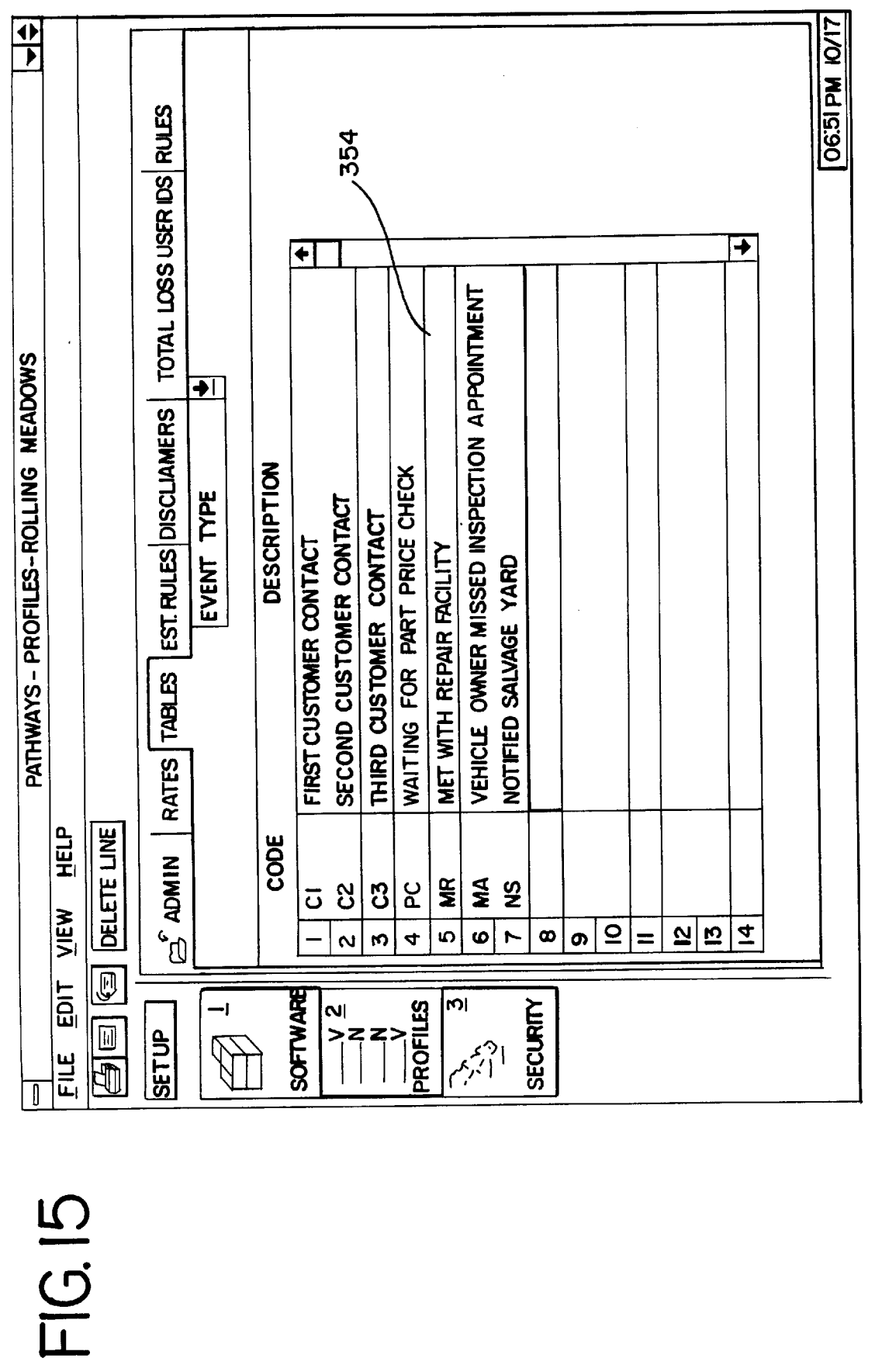

As additional explanation of the event log steps discussed in FIG. 8H that may be performed according to a preferred embodiment, FIGS. 13–15 provide an illustration of the steps a user may take through the graphic user interface. The event log records events/actions taken with respect to each insurance datafile. The event log, which is attached to the datafile, preferably automatically puts a time and date stamp on certain predetermined tasks or activities. There also may be manually entered event information added to the log. As is indicated in FIG. 13, the event log may be selected for viewing through the user interface. By clicking onto the event log tab in an opened workfile, an event screen 350 is shown listing the date, time, type of action and author of each event. A specific event may be selected to view, or to enter, additional textual information concerning the selected event.

To manually enter an event, a user may select from an event description menu 352 and either click on the relevant description or type in the code for the description as is shown in FIG. 14. FIG. 15 shows a setup menu with the table 354 of predetermined events that are available for selection in the events tab. The event log is useful both for appraisers/adjusters and insurance company managers to monitor claim processing efficiency. In one embodiment, only certain users may alter or add to the event log based on login identification, passwords or other security means.

The following description of preferred embodiments describes, without loss of generality, the invention as applied to insurance claims for damaged vehicles as the damaged objects of the insurance claims.

The user has the option to view, using user input, a generic parts illustration for the selected part. The remote computer retrieves a parts illustration associated with the part from a memory device, and loads the parts illustration graphics image into a memory buffer. The user may then zoom in on the illustration to get a closer look at the part of interest. In a preferred embodiment, the textual description of the parts may be seen at the same time as the parts illustrations.

Referring to FIGS. 8F and 8G, once a user has selected the part or parts that are damaged, the user has the option to select using user input, whether to replace or repair the part. If the user chooses to replace the part, cost means estimates a replacement cost with OEM parts, a replacement cost with A/M parts, and a replacement cost with salvage parts. The method compares the replacement costs to determine a lowest replacement cost. The replacement cost broadly includes a part cost to replace a part, labor hours to install the part, and paint hours to paint the part, if required. If the user chooses to repair the part, the user enters user repair hours, and paint hour values. The repair sum may or may not include costs for edging and other finishing work. After selecting all the necessary repairs and replacement parts; including labor costs and labor overlap savings, the computer calculates the total cost to repair or replace the damaged parts.

Figure 16:
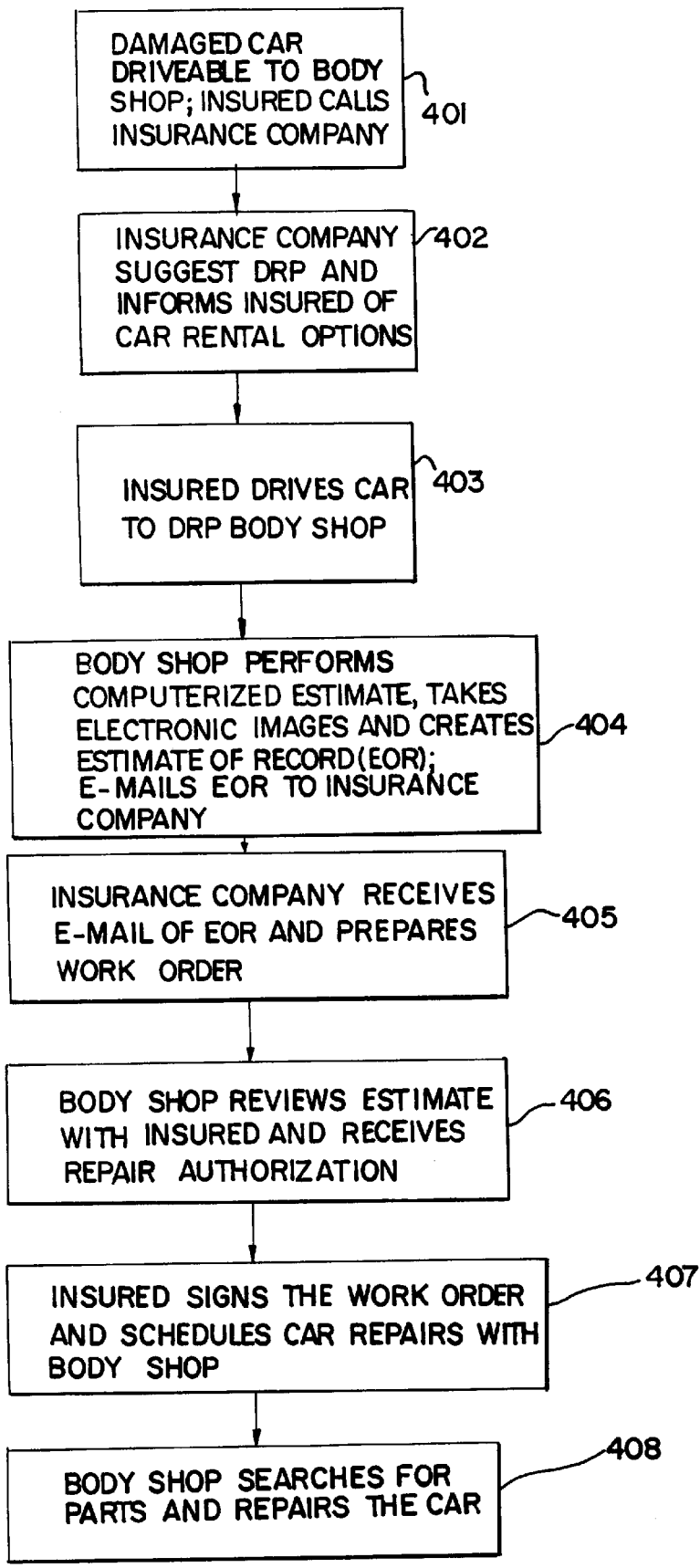
FIG. 16 is a flow chart of steps taken to repair a driveable vehicle in a DRP repair facility.

FIG. 16 illustrates one claim processing scenario that may be addressed with the presently preferred system and method with a damaged car driveable to a body shop employing a direct repair program (DRP). After damage to or loss of the car, the insured calls 401 the insurance company, and the insurance company suggests 402 a DRP body shop and informs the insured of car rental options. The insured drives 403 the car to the DRP body shop. The home office sends a claim assignment to the mailbox of the DRP in the Communications server. The body shop accesses the assigned claim and sets up a work file as described above. Using the method described above, the body shop prepares a computerized estimate. The body shop also takes electronic images of the car and keeps the estimate and images on local storage, for example a disk drive, or sends the estimate and images to a library for storing. The body shop then creates 404 a computer Estimate-Of-Record (EOR) and e-mails via the out box, as part of a work file, the EOR and electronic images to the insurance company. The insurance company receives 405 the e-mail of the EOR and the electronic images, prepares a work order, and e-mails, as part of a work file, an authorization number or work order number to the body shop. The body shop reviews 406 the estimate with the insured and receives repair authorization. The insured signs 407 the work order and schedules repair work with the body shop.

Figure 18:
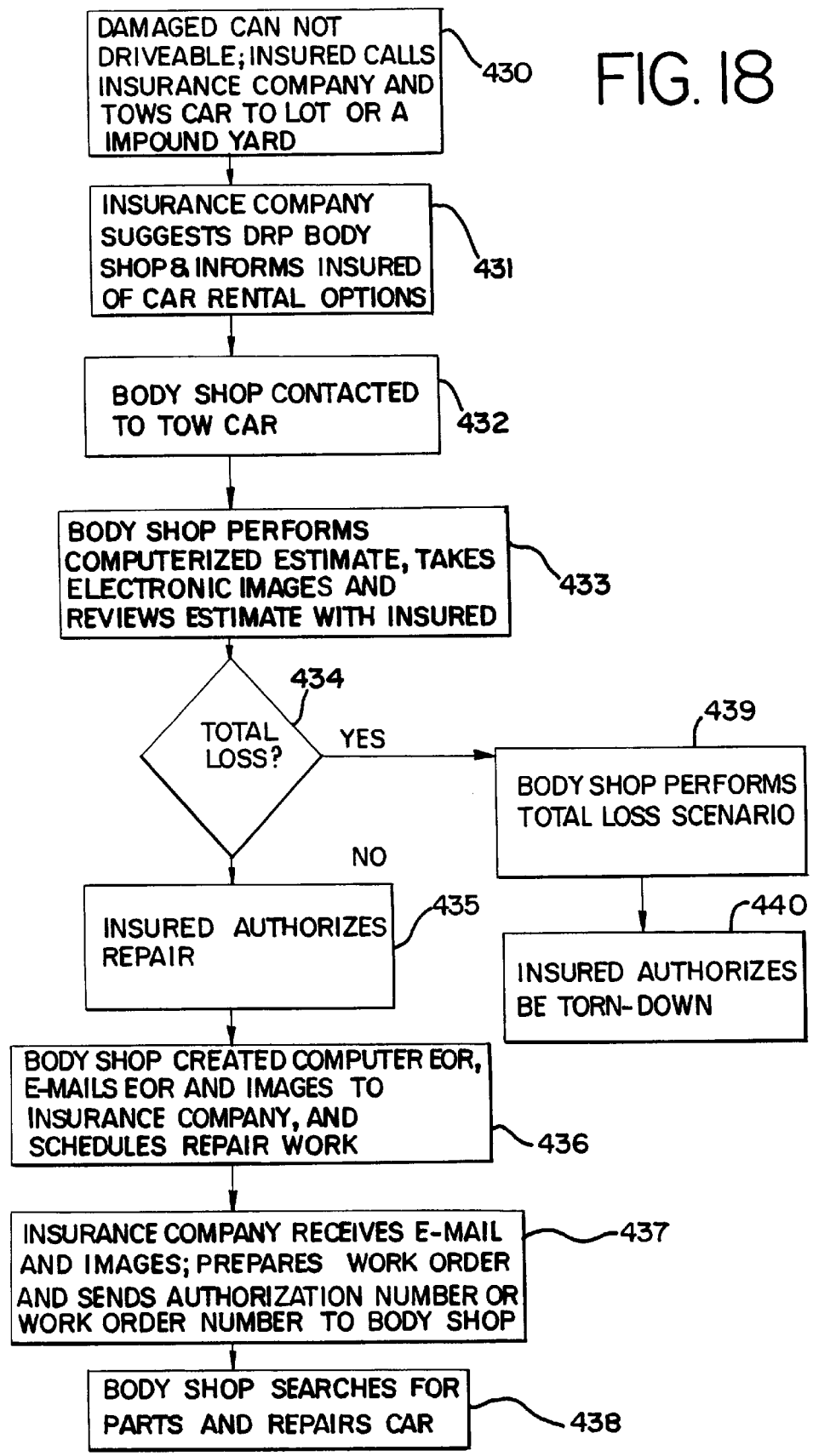
FIG. 18 is a flow chart of steps taken to repair a non-driveable vehicle in a DRP repair facility.
Figure 19:
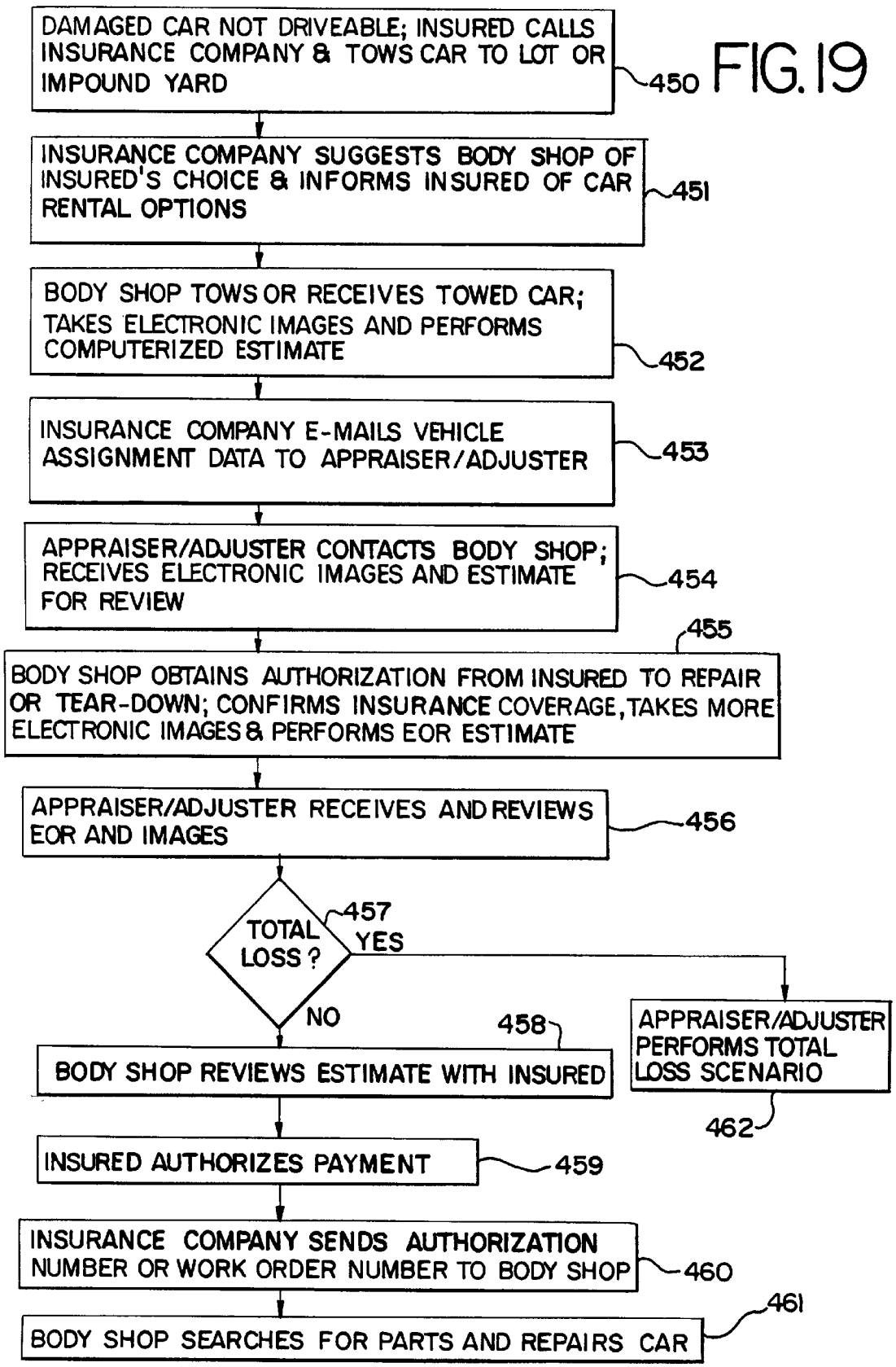
FIG. 19 is a flow chart of steps taken to repair a non-driveable vehicle in a non-DRP repair facility.

The body shop searches 408 for Like Kind and Quality (LKQ) parts, using the procedure shown in FIG. 18 and/or searches 408 for new or aftermarket (A/M) parts, using the procedure shown in FIG. 19. The term LKQ is used herein to refer to recycled/salvaged parts. The body shop repairs 408 the damaged car using the procedure shown in FIG. 20.

Figure 17:
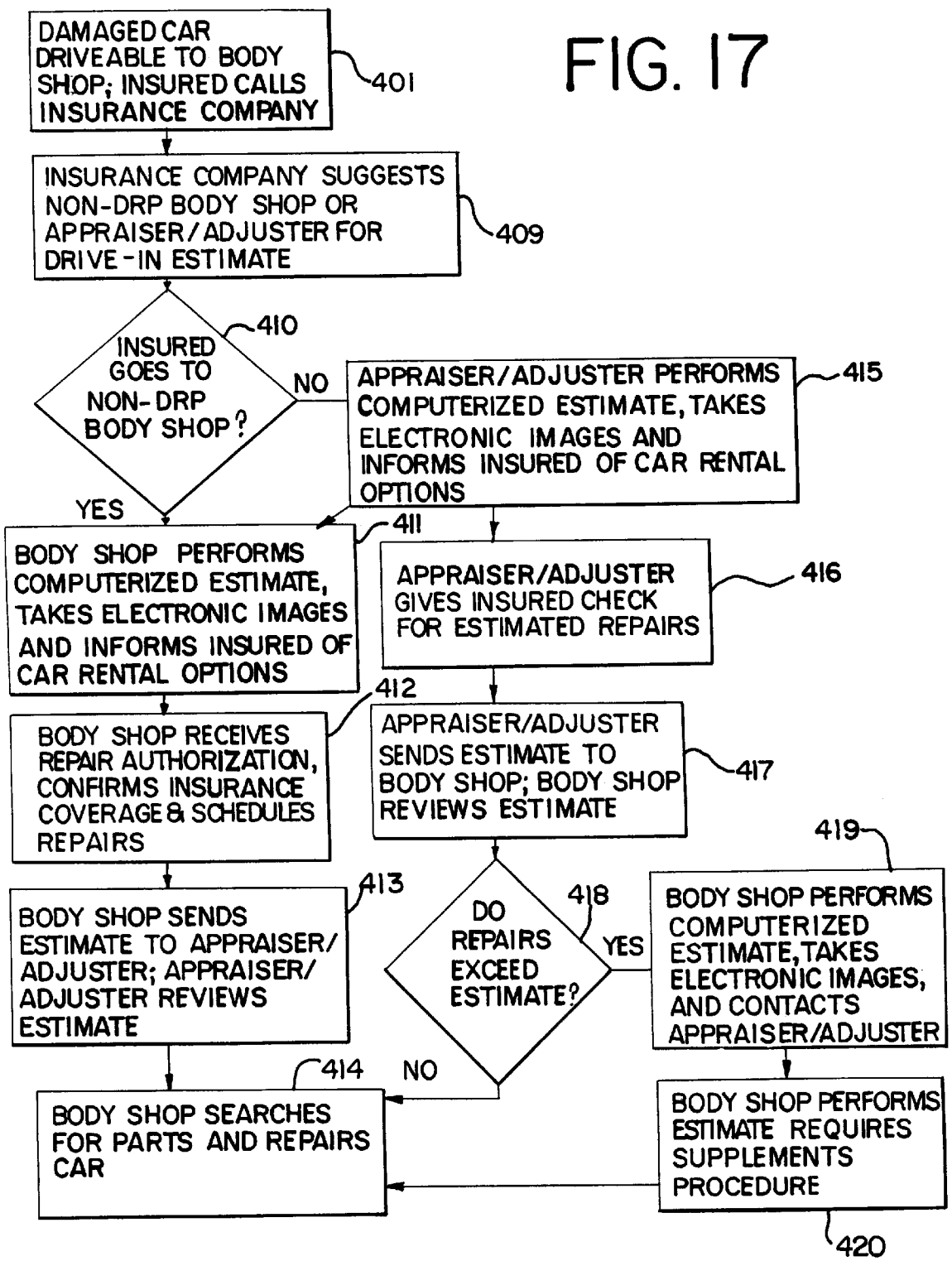
FIG. 17 is a flow chart of steps taken to repair a driveable vehicle in a non-DRP repair facility.

Referring to FIG. 17, the car may alternatively be brought to a non-DRP body shop, with the insured contacting 401 the insurance company and the insurance company suggesting 409 a drive-in estimate location at a body shop or at the location of an appraiser or adjuster. The insured brings 410 the car to the body shop and requests an estimate. The body shop performs 411 a computerized estimate using estimating software employing the methods described herein. The body shop also takes 411 electronic images of the car, and keeps the estimate and images on local storage, for example a disk drive, or sends, as part of the work file, the estimate and images to a library for storing, and informs the insured of car rental options.

The insured determines where and when to get the car repaired, schedules a repair date, and signs a repair order. The body shop receives 412 repair authorization; confirms insurance coverage; and schedules repair work or receives the car for repairs. The body shop sends 413 the estimate to the appraiser/adjuster. The appraiser/adjuster reviews 413 the estimate, and the body shop repairs 414 the car.

Alternatively, the insured can bring 410 the car directly to an appraiser/adjuster. The appraiser/adjuster performs 415 a computerized estimate, takes electronic images, and informs the insured of car rental options. The appraiser/adjuster gives 416 the insured a check for the estimated repairs. The appraiser/adjuster sends 417 the estimate to the body shop and the body shop reviews the estimate.

Figure 22:
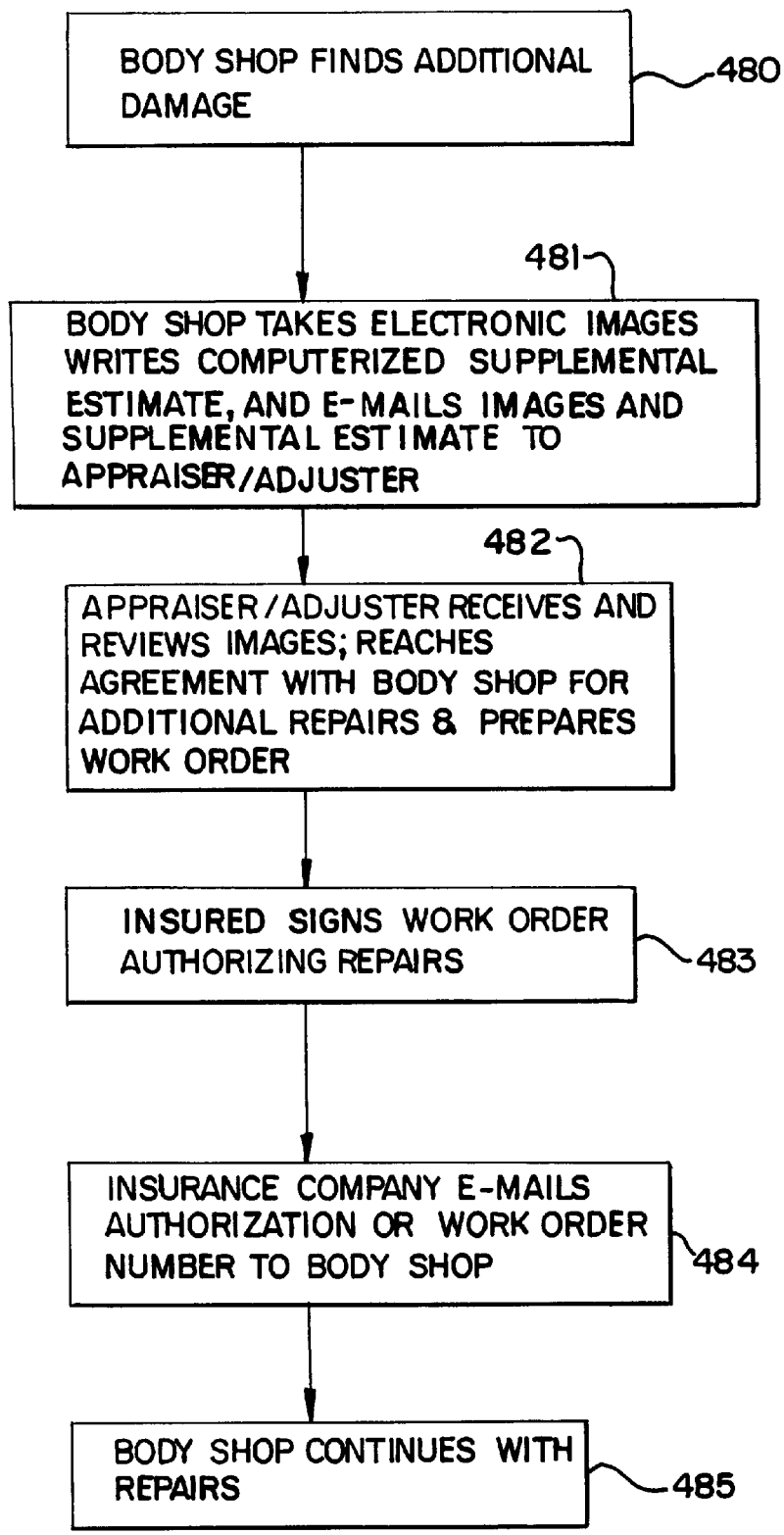
FIG. 22 is a flow chart of a preferred estimate requires supplement procedure.

If the body shop determined 418 that the repairs exceed the appraiser/adjuster's estimate, then the body shop performs 419 its own computerized estimate, takes electronic images, of the car, and contacts the appraiser/adjuster. The body shop performs 420 an Estimate Requires Supplements procedure as shown in FIG. 22. Alternatively, if the body shop determines 418 that the repairs do not exceed the appraiser/adjuster's estimate, the body shop 414 searches for parts and repairs the car.

After the Estimate Requires Supplements procedure is performed, the body shop continues with the repairs. The body shop searches 414 for Like Kind and Quality (LKQ) parts, using the procedure shown in FIG. 23, and/or searches 414 for new or aftermarket (A/M) parts, using the procedure shown in FIG. 24, and repairs 414 the damaged car, using the procedure shown in FIG. 22.

In a third situation, as shown in FIG. 18, if the car is not driveable 430, the insured calls 430 the insurance company and has the car towed 431 to a lot or impound yard. The insurance company suggests 431 the insured move the car to the DRP body shop and informs the insured of car rental options. The body shop is contacted 432 by either the insured or the insurance company to tow the car from the tow lot or impound yard.

Figure 21:
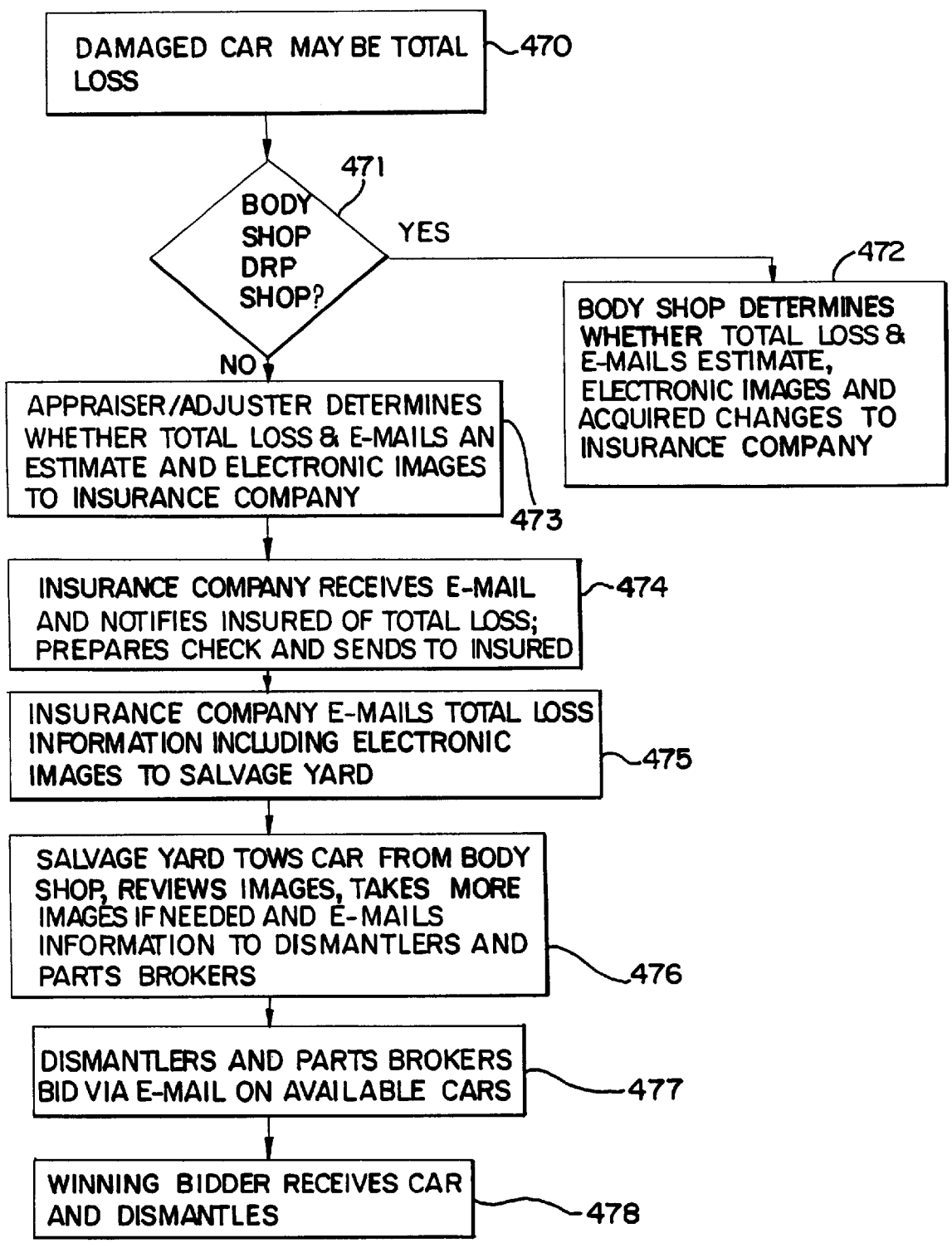
FIG. 21 is a flow chart of a preferred total loss procedure.

The body shop prepares 433 an estimate using estimating computer software, employing the methods described above. The body shop also takes electronic images of the car; keeps the estimate and images on local storage, for example a disk drive, or sends the estimate and images to a library for storing estimates and images; and reviews the estimate with the insured. If the car were deemed a total loss 434, then the body shop performs 439 a total loss calculation, using the procedure as shown in FIG. 21. The insured authorizes 440 that the car be torn-down.

If the car were not a total loss 434, then the insured authorizes 435 repairs to the car. Upon receiving the repair authorization 435, the body shop creates 436 a computer EOR, e-mails the EOR and the images to the insurance company, and schedules the repair work.

The insurance company receives 437 the e-mail of the EOR and the electronic images, prepares a work order, and sends an authorization number or work order number to the body shop. In addition, an auditor may receive the EOR and electronic images and may audit the electronic images and estimate.

Figure 23:
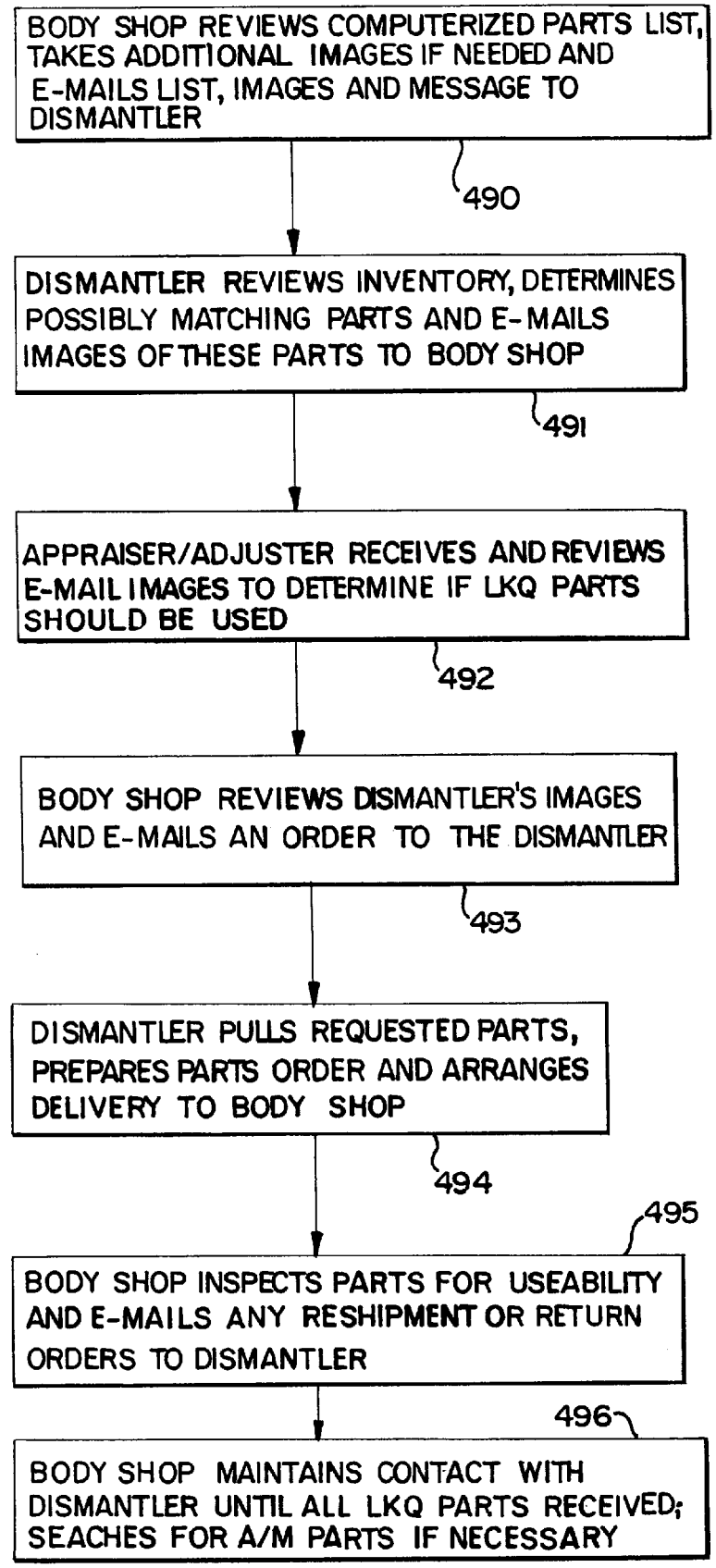
FIG. 23 is a flow chart of a preferred like kind and quality (LKQ) parts search.
Figure 24:
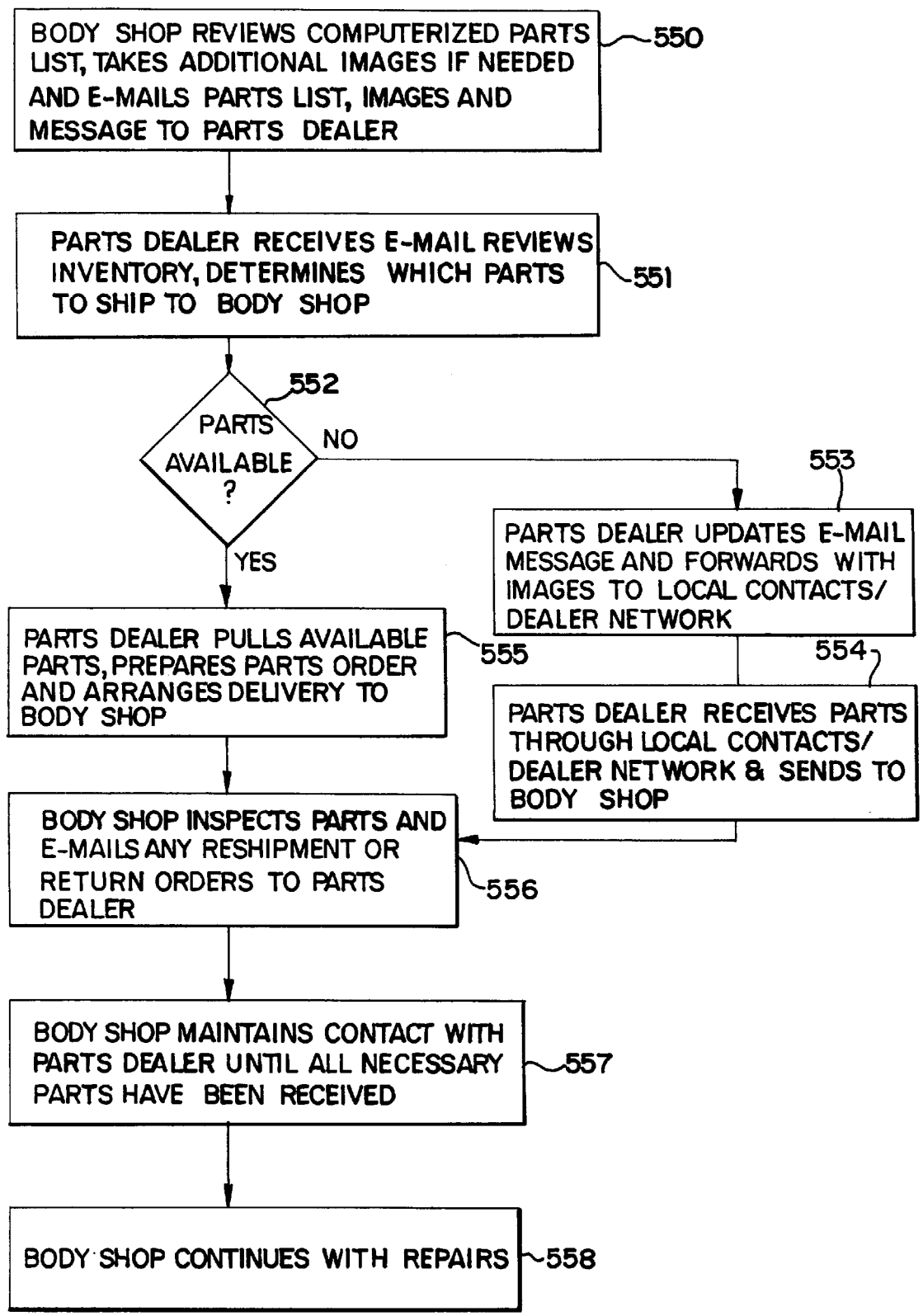
FIG. 24 is a flow chart of a preferred aftermarket parts search.

The body shop searches 438 for Like Kind and Quality (LKQ) parts, using the procedure shown in FIG. 23, and/or searches 438 for new or aftermarket (A/M) parts, using the procedure shown in FIG. 24. The body shop receives the necessary parts, confirms scheduled repairs, and repairs 438 the damaged car, using the procedure shown in FIG. 20.

In a fourth situation, as shown in FIG. 19, the car is not driveable 450, and the insured calls the insurance company. The insured has the car towed 450 to a tow lot or impound area. The insurance company suggests 451 that the insured move the car to a body shop of the insured's choice, and the insurance company may also inform the insured of car rental options. The insurance company also e-mails 453 vehicle assignment data to an appraiser/adjuster. Subsequently, the appraiser/adjuster contacts 454 the body shop.

Either the body shop tows 452 the car or receives the towed car; the body shop takes 452 electronic images of the car; and the body shop may provide car rental information to the insured. The body shop performs 452 a preliminary computerized estimate 20 using computer estimate software employing the methods described herein. The body shop e-mails the estimate and electronic images to the appraiser/adjuster. The appraiser/adjuster subsequently receives 454 the electronic images for review and if necessary, requests more images.

The body shop obtains 455 authorization from the insured or from the owner to either repair the car or tear down the car, and the body shop confirms 455 insurance coverage. The body shop takes more electronic images, performs a computer EOR estimate, and e-mails the EOR and electronic images to the appraiser/adjuster. The appraiser/adjuster reviews 456 the computer EOR and electronic images, and reaches an agreement with the body shop. If the car were deemed a Total Loss 457, then the appraiser/adjuster performs 462 a Total Loss scenario, using a Total Loss procedure as shown in FIG. 21. If the car is not deemed a total loss 457, then the repair shop proceeds through steps 458 through 461 as shown in FIG. 17 and explained below.

The body shop keeps the estimate and electronic images on local storage, for example a disk drive, or sends the estimate and images to a library for storing; and reviews 458 the estimate with the insured. After the insured authorizes 459 payment for repairs, the insurance company sends 460 an authorization number or a work order number to the body shop, and the body shop searches 461 for Like Kind and Quality (LKQ) parts, using the procedure shown in FIG. 24, and/or searches 461 for new or after-market (A/M) parts, using the procedure shown in FIG. 25. The body shop then receives all of the necessary parts, confirms scheduled repairs, and repairs 461 the damaged car, using the procedure shown in FIG. 20.

Figure 20:
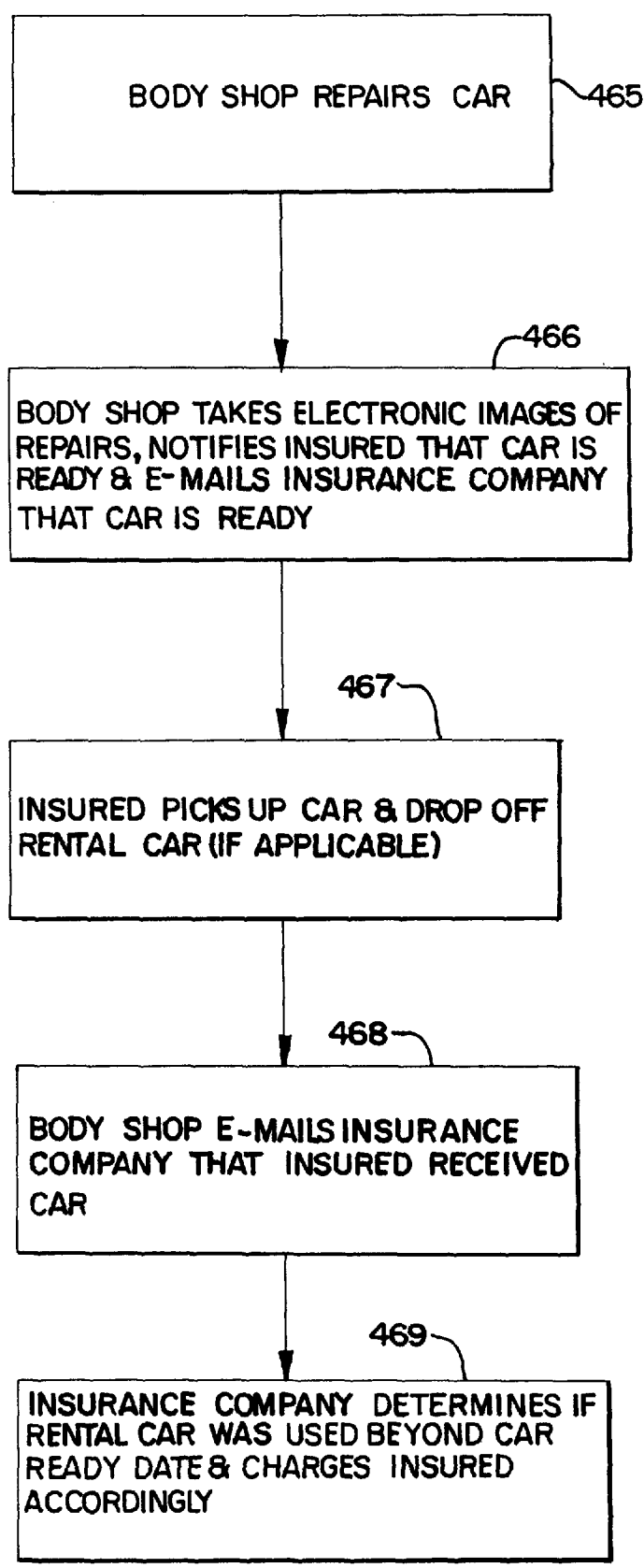
FIG. 20 is a flow chart of a preferred method of estimating vehicle repair costs.

In each of the described damage scenarios, whether the car is driveable or not driveable, and whether the body shop is a DRP shop or a non-DRP shop, as illustrated in FIGS. 16–20, upon authorization for repairs, the body shop searches and obtains the necessary parts for repairs and performs a repair scenario as illustrated in FIG. 20. The body shop repairs 465 the car. The body shop then takes 466 digital images of the repairs, storing these images on local storage such as, for example, a disk drive, and notifies 466 the insured that the repaired car is ready. In addition, the body shop e-mails 466 a notification to the insurance company that the repairs are completed.

The insured picks up 467 the repaired car at the body shop, and the insured drops off any rental car for later retrieval by a car rental agency. The body shop proceeds to e-mail 468 a notification to the insurance company that the insured has received the repaired car. The insurance company determines 469 if the rental car was used beyond the ready date of the repaired car, and the insurance company charges the insured accordingly.

As illustrated in FIG. 21, if the damaged car were deemed 470 a Total Loss, a Total Loss scenario is performed. If the body shop is a non-DRP shop 471, an appraiser/adjuster determines 473 if the car is a Total Loss, and the appraiser/adjuster e-mails 473 an estimate and electronic images to the insurance company. However, if the body shop were a DRP shop 471, then the body shop determines 472 if the car is a Total Loss, and the body shop e-mails 472 the estimate, images, and any acquired charges to the insurance company, with acquired charges including tow charges, tear-down charges, and storage charges.

Upon receiving the e-mail, the insurance company notifies 474 the insured that the car is a Total Loss, and the insurance company prepares and sends a settlement check to the insured for the Total Loss. The insurance company also e-mails 475 a notification of the Total Loss to a salvage yard or salvage pool, and directs the car to be sent to a specific salvage yard. In addition, the insurance company e-mails 475 electronic images of the car to the salvage yard. The salvage yard tows 476 the car from the body shop, reviews the images for missing parts, and takes any additional images for car disposal. The salvage yard contacts dismantlers and parts brokers, and the salvage yard e-mails 476 images and messages including the car information to the dismantlers and parts brokers.

The dismantlers and parts brokers bid 477 via e-mail on the cars available at the salvage yard, while the salvage yard conducts an auction on the cars as the salvage yard receives e-mail bids. After the auction, the winning bidder receives 478 a car deemed a Total Loss, dismantles the car, adds the resultant parts to the inventory of the dismantler, and scraps the remainder of the car.

An Estimate Requires Supplements scenario is shown in FIG. 22. A body shop finds 480 additional damage, takes 481 electronic images, and prepares 481 computerized supplemental estimate using the method described in FIGS. 8A–8L.

The body shop e-mails 481 the images and supplemental estimate to an appraiser/adjuster, and the appraiser/adjuster receives and reviews 482 the images. The appraiser/adjuster reaches an agreement with the body shop on the additional repairs, and the appraiser/adjuster prepares 482 a work order. The insured signs 483 the work order authorizing repairs, and the insurance company e-mails 484 an authorization number or work order number to the body shop. Upon receipt of repair authorization, the body shop continues 485 with the repairs and the search for parts for the car.

A Search for LKQ Parts scenario is shown in FIG. 23. The body shop reviews 490 a computerized parts list, determines that other images are needed to obtain the correct parts, takes electronic images and image plates, and e-mails the parts list, images, and a message to a dismantler to obtain the necessary parts. On receiving the e-mail, a dismantler reviews 491 the dismantler's inventory, compares the available parts to the received images, determines which parts are possible matches, takes electronic parts images, and e-mails the electronic parts images of the available parts to the body shop. The dismantler may initiate his/her own search for unavailable parts, update an e-mail message requesting parts, and forward images and a message requesting parts to other contacts.

An appraiser/adjuster receives and reviews 492 e-mail images, including images of the LKQ parts to determine, if LKQ parts should be used. The body shop reviews 493 the dismantler's electronic parts images, determines which parts to order, and e-mails an order to the dismantler. The dismantler pulls 494 requested parts from his/her inventory, prepares a parts order, and arranges delivery of parts to the body shop. Upon receipt of the delivered parts, the body shop inspects 495 the parts for damage, correctness, and completeness. The body 25 shop e-mails 495 to the dismantler directions to re-ship any alternative parts, and arranges to return any damaged parts.

The body shop maintains 496 contact with the dismantler until the body shop receives all LKQ parts, and then the body shop continues with the repairs. If the body shop decided to get new parts, then the body shop searches 496 for A/M parts.

A Search for new or after-market (A/M) Parts scenario is shown in FIG. 24. A body shop reviews 550 a computerized parts list, determines if other images are needed to obtain the correct parts, takes electronic images and images of a parts plate, and e-mails a parts list, images, and a message requesting parts to a parts dealer or A/M parts distributor. The parts dealer or A/M parts distributor receives 551 the e-mail, reviews the inventory, compares the parts available to the images, and determines which parts to ship to the body shop. If the parts were unavailable 552, then the parts dealer or A/M parts distributor updates 553 the e-mail message and forwards the images and message to local contacts or through a dealer network to obtain the necessary parts. When the parts dealer receive 554 the necessary parts, then the necessary parts are sent to the body shop.

The parts dealer or A/M distributor pulls 555 the available parts, prepares a parts order, and arranges delivery to the body shop. Upon delivery, the body shop inspects 556 the parts for damage, correctness, and completeness. The body shop e-mails 556 a message to the dealer to re-ship any alternative parts, and the body shop arranges to return any damaged parts to the dealer.

The body shop maintains 557 contact with the dealer until the body shop receives all necessary parts of an undamaged and correct quality and quantity, and the body shop continues 558 with the repairs to the car.

Figure 25:
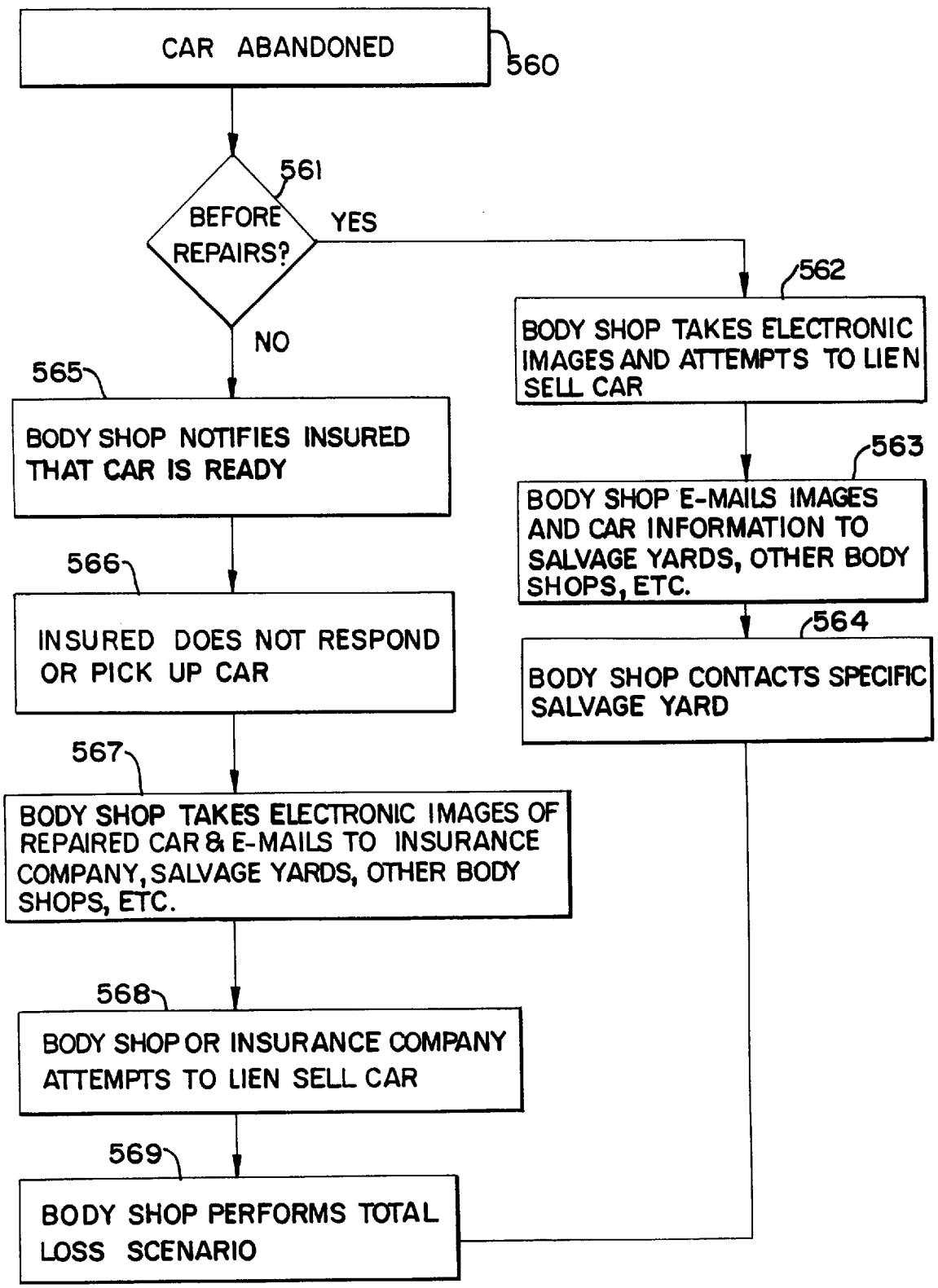
FIG. 25 is a flow chart illustrating claim management for an abandoned car.

As illustrated in FIG. 25, the body shop may also perform a scenario with a damaged car abandoned 560 by the owner/insured. If the car were abandoned 561 before the body shop begins repairs due to the body shop having never been authorized to begin repairs, then the body shop takes 562 electronic images of the car, and attempts to lien sell the car. The body shop accordingly E-mails 563 images and information about the car to salvage yards, other body shops, etc. The body shop also contacts 564 a specific salvage yard, and perform 569 the Total Loss Scenario as shown in FIG. 21.

As further illustrated in FIG. 25, if the car were abandoned 561 after authorized repairs to the car are completed, then the body shop notifies 565 the insured that the car is repaired. If the insured did not pick up 566 the repaired car, then the body shop takes 567 electronic images of the repaired car, and E-mails the images and car information to the insurance company, other body shops, and salvage yards. Either the insurance company or the body shop holding the repaired car may attempt 568 to lien sell the replaced car, or the body shop may perform 569 the Total Loss Scenario, as shown in FIG. 21.

From the foregoing, a comprehensive system and method for managing insurance claim processing has been described. The system includes at least one remote computer, a mainframe computer (or server), and a network connecting the computers wherein an insurance claim datafile containing information pertinent to a particular claim may be transferred, accessed and processed by authorized parties. A common graphic user interface allows users to manage claims workflow, including the performance of estimate calculations, preparation of settlement material and preparation of internal and external correspondence. Additionally, a method of processing an insurance claim has been described that permits a user or users to create an insurance workfile and transfer all or part of the workfile over a network between computers at various locations where additional administrative or calculation steps may be performed and appended to the workfile.

It is intended that the foregoing detailed description be regarded as illustrative rather than limiting, and that it be understood that the following claims, including all equivalents, are intended to define the scope of this invention.

We claim:

1. A method of managing insurance claim processing comprising the steps of:

providing a remote computer in communication with a wide area network, said wide area network in communication with a computer in an insurance company home office;

sending an insurance claim work assignment from the insurance company home office computer to a communication server in the wide area network;

storing the insurance claim work assignment in an electronic mailbox in the communication server;

obtaining the insurance claim work assignment at the remote computer from the communication server;

generating an insurance claim datafile on the remote computer, said datafile corresponding to said insurance claim work assignment and configured to receive all data pertinent for processing an insurance claim;

allowing for bidirectional transmission of the datafile over the wide area network; and building sections of the datafile at the remote computer using information accessed from an external source to the remote computer.

2. The method of claim 1 wherein said datafile contains data on an insured, data on a claim, and data on satisfying a claim.

3. The method of claim 1 further comprising the step of converting the entire datafile into a formatted datafile to allow transmission over said network.

4. The method of claim 1 wherein said insurance claim datafile comprises a vehicle insurance datafile and the step of generating an insurance claim datafile comprises the steps of:

Recording data in the datafile on an insured and an assigned insurance claims adjuster;

Recording data related to an insured vehicle in the datafile; and

Recording vehicle parts data relating to OEM, aftermarket, and salvage parts for repair of the insured vehicle.

5. The method of claim 1 wherein the step of building the insurance datafile comprises transmitting a predetermined amount of data related to calculating a vehicle total loss valuation to the server, receiving the total loss valuation at the remote computer, and appending the total loss valuation to the datafile.

6. The method of claim 1 wherein the step of building the insurance datafile comprises collecting a predetermined amount of data related to a vehicle, accessing a database containing vehicle valuation information, retrieving the vehicle valuation at the remote computer, and appending the valuation to the datafile.

7. The method of claim 1 further comprising the steps of:

generating an event log, said event log including information on actions taken on the claim; and appending the event log to the datafile whereby a user may review the event log.

8. The method of claim 7 wherein the step of generating an event log comprises automatically generating event log entries.

9. The method of claim 7 wherein the step of generating an event log comprises manually selecting an event log entry.

10. The method of claim 1 wherein the entire formatted datafile is transmitted from the remote computer to the server via the wide area network, whereby said entire formatted datafile is retrievable from said server for future update.

11. The method of claim 10 wherein the step of formatting the datafile comprises formatting the datafile into network TCP/IP format, whereby the remote computer may readily communicate with, and transfer the entire datafile to, the computer in the home office.

12. The method of claim 11 further comprising the steps of a user selecting a portion of the insurance datafile from a predetermined list of portions that may be individually sent to a third party, and transmitting the selected portion of the insurance datafile to the third party.

13. A method of managing insurance claims processing comprising the steps of:

providing a remote computer in communication with a wide area network, said wide area network in communication with a computer in a home office;

generating an insurance claim datafile on the remote computer, said datafile containing data on an insured, data on a claim, data on satisfying a claim, wherein said datafile is configured to receive all data pertinent to the claim;

modifying the datafile at the remote computer to update the datafile with information accessed from an external source to the remote computer wherein the datafile contains an estimated total loss valuation and information for calculating a repair estimate; and determining if a vehicle is approaching a total loss by automatically monitoring repair estimate calculations and the estimated total loss valuation.

14. A system for processing an insurance claim comprising:

a remote computer for entering data related to an insured;

a wide area network having a communication server capable of communicating with said remote computer;

a computer in communication with said wide area network; and an insurance claim datafile, generated at said remote computer, wherein the entire datafile is transferrable over the network, said insurance claim datafile comprising:

data on an insured including the name and policy number of the insured, the insurance claim number, and the nature of the claim; and an event log for listing a date and an author of each action taken on the insurance claim datafile whereby an insurance company may monitor efficiency of claim handling.

15. The system of claim 14 further comprising a plurality of remote computers capable of accessing an insurance claim datafile, wherein only one of said remote computers and said servers may access the entire datafile at a time.

16. The system of claim 14 further comprising a user interface for providing access to at least one insurance datafile.

17. The system of claim 16 wherein the interface comprises an in box for receiving at least one datafile from the communication server.

18. The system of claim 16 wherein the interface comprises an out box for temporarily storing at least one datafile, said out box for transmitting the at least one datafile to the communication server.

19. The system of claim 16 wherein the interface comprises an in process box for storing at least one datafile a user is currently working on.

20. The system of claim 14 wherein the insurance claim datafile further comprises:

data gathered concerning the extent of damage or injury suffered by the insured;

correspondence related to the claim, whereby the correspondence includes form letters sent to the insured; and messages, related to the claim, sent between insurance company employees via electronic mail.

21. The system of claim 20 wherein the datafile further comprises electronic images created of insured subject matter.

22. The system of claim 21 wherein the insured subject matter is a vehicle.

23. The system of claim 22 wherein the datafile further comprises vehicle identification information and information on vehicle options.

24. The system of claim 22 wherein the data gathered concerning the extent of damage or injury suffered by the insured further comprises an inspection report.

25. The system of claim 22 wherein the insurance datafile further comprises salvage information.

26. The system of claim 22 wherein the insurance datafile further comprises a repair estimate having OEM, aftermarket and recycled parts costs.

27. The system of claim 22 wherein the insurance claim datafile further comprises insurance claim settlement information.

28. The system of claim 22 wherein the insurance datafile further comprises a total loss calculation.

29. A system for processing insurance claims comprising:
a remote computer for entering data related to an insured;
a wide area network capable of communicating with said remote computer;
a computer in communication with said wide area network;
an insurance claim datafile, generated at said remote computer, wherein the entire datafile is transferable between the remote computer and the computer, said datafile having inspection, repair estimate, total loss, and settlement information related to an automobile insurance claim; and
a user interface for managing insurance claim datafile processing pertaining to an insurance claim, said user interface allowing communication of input and output data, said user interface further comprising means for calculating and comparing repair and total loss values.

30. The system of claim 29 wherein the interface further comprises:
a display for viewing a universal entry screen;
means for entering data onto the display;
interface logic, coupled to the display for processing data entered on said data entering means and communicating said data to the universal entry screen on said display.

31. The system of claim 30 wherein the universal entry screen displays a datafile having a plurality of tabbed sections, each of said tabbed sections accessible by a user through said data entering means.

32. The system of claim 31 wherein the plurality of tabbed sections comprise:
an administrative data tab for insurance company claim administration information;
a vehicle information tab for information pertaining to an insured vehicle;
an estimate tab for gathering and computing information on vehicle repair costs;
a salvage tab for gathering and computing information on potential vehicle salvage values; and
a settlement tab for storing and updating claim settlement information.

33. The system of claim 32 wherein the tabbed sections further comprise:
a totals tab for viewing and manipulating estimate totals;
a total loss tab for viewing and manipulating a total loss calculation;
a notes tab containing user remarks regarding a claim;
a correspondence tab containing letters related to an insured;
a rates tab for containing labor, tax, and discount rates; and
an event log tab for maintaining a list of actions taken on the datafile.

34. A graphic user interface for use in managing an insurance claim from an initial claim to final settlement comprising:
an in box capable of holding at least one insurance datafile for a user to process;
an in process box, the in process box for holding at least one insurance datafile that the user has begun working on; and
an out box, the out box for holding at least one insurance datafile that the user has completed work on wherein said in box, in process box, and out box are concurrently visible to the user so that insurance claim processing workflow is readily apparent to the user.

35. The graphic user interface of claim 34 further comprising a datafile window for displaying an opened insurance claim datafile, said opened datafile in said datafile window having a plurality of overlapping sections, each section having a visible identification tab.

36. The graphic user interface of claim 34 further comprising a button bar having a plurality of user choices, said button bar including at least one context sensitive button representative of a relevant user choice for information currently being viewed in the datafile window.

37. A system for processing an insurance claim for a vehicle, the system comprising:
a first computer for generating an insurance claim assignment;
a communication server capable of communicating with the first computer over a communication network;
a second computer in communication with the communication server;
a plurality of insurance claim datafiles generated at the second computer, each insurance claim datafile transferable over the communication network, and a plurality of insurance claim assignments, each of the plurality of insurance claim datafiles associated with a respective one of the insurance claim assignments; and
a graphic user interface at the second computer, the graphic user interface comprising an estimate comparison screen for displaying information on a selected one of the plurality of insurance claim datafiles, the estimate comparison screen simultaneously displaying replacement cost data for original equipment manufacturer (OEM) parts, recycled parts, and after market parts, and displaying a part repair cost.

38. The system of claim 37, wherein the graphic user interface further comprises
a workflow management section, the workflow management section comprising an in box, an out box, and an in process box, wherein each of the in box, out box and in process box are configured to hold at least one insurance claim datafile, whereby insurance claim processing workflow is managed at the second computer.

39. The system of claim 37, wherein at least one of the plurality of insurance claim datafiles further comprises an event log, the event log containing a date and an author of each action taken on the at least one insurance claim datafile.

\* \* \* \* \*